(12) United States Patent
Song et al.

(10) Patent No.: US 11,921,981 B2
(45) Date of Patent: *Mar. 5, 2024

(54) WINDOWING CONTAINER

(71) Applicant: Microsoft Technology Licensing, LLC, Redmond, WA (US)

(72) Inventors: Samantha Madeline Song, Seattle, WA (US); Anna Marion Pfoertsch, Brooklyn, WA (US); Roberth Karman, Redmond, WA (US); Nihar Niranjan Shah, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/957,942

(22) Filed: Sep. 30, 2022

(65) Prior Publication Data
US 2023/0066691 A1 Mar. 2, 2023

Related U.S. Application Data

(63) Continuation of application No. 17/464,424, filed on Sep. 1, 2021, now Pat. No. 11,487,406.

(51) Int. Cl.
G06F 3/0482 (2013.01)
G06F 3/04812 (2022.01)
(Continued)

(52) U.S. Cl.
CPC ........ G06F 3/0482 (2013.01); G06F 3/04812 (2013.01); G06F 3/04817 (2013.01); G06F 3/0486 (2013.01)

(58) Field of Classification Search
CPC ............... G06F 3/0482; G06F 3/04812; G06F 3/04817; G06F 3/0486
See application file for complete search history.

(56) References Cited

U.S. PATENT DOCUMENTS 5,974,384 A * 10/1999 Yasuda ................... G10L 15/22
704/E15.04
5,977,973 A * 11/1999 Sobeski ................... G09G 5/14
715/804

(Continued)

OTHER PUBLICATIONS

Kandogan, et al., "Elastic Windows: Evaluation of Multi-Window Operations", In Proceedings of the ACM SIGCHI Conference on Human Factors in Computing Systems, Mar. 22, 1997, pp. 250-257.

(Continued)

Primary Examiner — Jeanette J Parker

(57) ABSTRACT

Examples of the present disclosure describe systems and methods for a windowing container that enables two or more windows associated with application(s) to be grouped within the container such that the windows may behave or function uniformly as a single window. For example, responsive to a request to group two windows, a container may be generated to include the windows arranged based on one or more rules and features enabling group functions associated with the container to be performed. When a group function is performed on the container, the function may be performed to each of the windows arranged therein as if they were a single window. As new windows are grouped within or existing windows are released from the container, the container and/or windows may be rearranged based on the rules. A state of the container may be stored to enable subsequent invocation of the container after closing.

20 Claims, 31 Drawing Sheets

(51) Int. Cl.
 *G06F 3/04817* (2022.01)
 *G06F 3/0486* (2013.01)

(56) References Cited

U.S. PATENT DOCUMENTS

| | | | | |
|---|---|---|---|---|
| 6,008,809 | A * | 12/1999 | Brooks | G06F 3/0481 |
| | | | | 715/792 |
| 7,913,183 | B2 | 3/2011 | Czerwinski et al. | |
| 2014/0040819 | A1* | 2/2014 | Duffy | G06F 3/0481 |
| | | | | 715/789 |
| 2014/0223313 | A1* | 8/2014 | Aebi | G06F 3/04845 |
| | | | | 715/733 |
| 2014/0282217 | A1* | 9/2014 | Musa | G06F 3/0481 |
| | | | | 715/781 |
| 2015/0050633 | A1* | 2/2015 | Christmas | G06F 3/0484 |
| | | | | 715/762 |
| 2017/0344218 | A1* | 11/2017 | Jann | G06F 3/0483 |
| 2019/0354251 | A1* | 11/2019 | Schleifer | G06F 9/541 |
| 2022/0397995 | A1* | 12/2022 | Misra | G06F 3/0482 |

OTHER PUBLICATIONS

"International Search Report and Written Opinion Issued in PCT Application No. PCT/US22/037101", dated Nov. 8, 2022, 13 Pages.

* cited by examiner

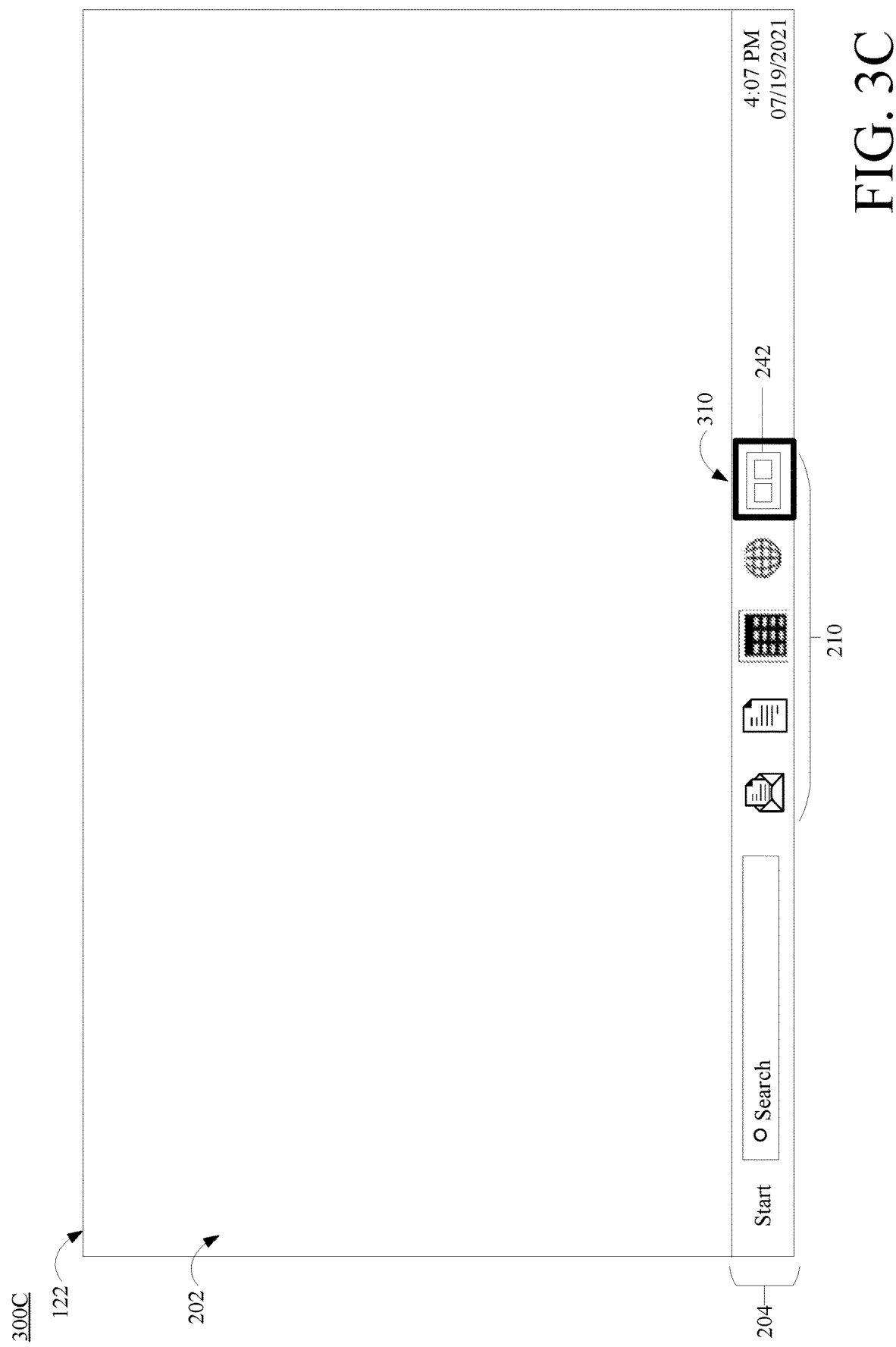

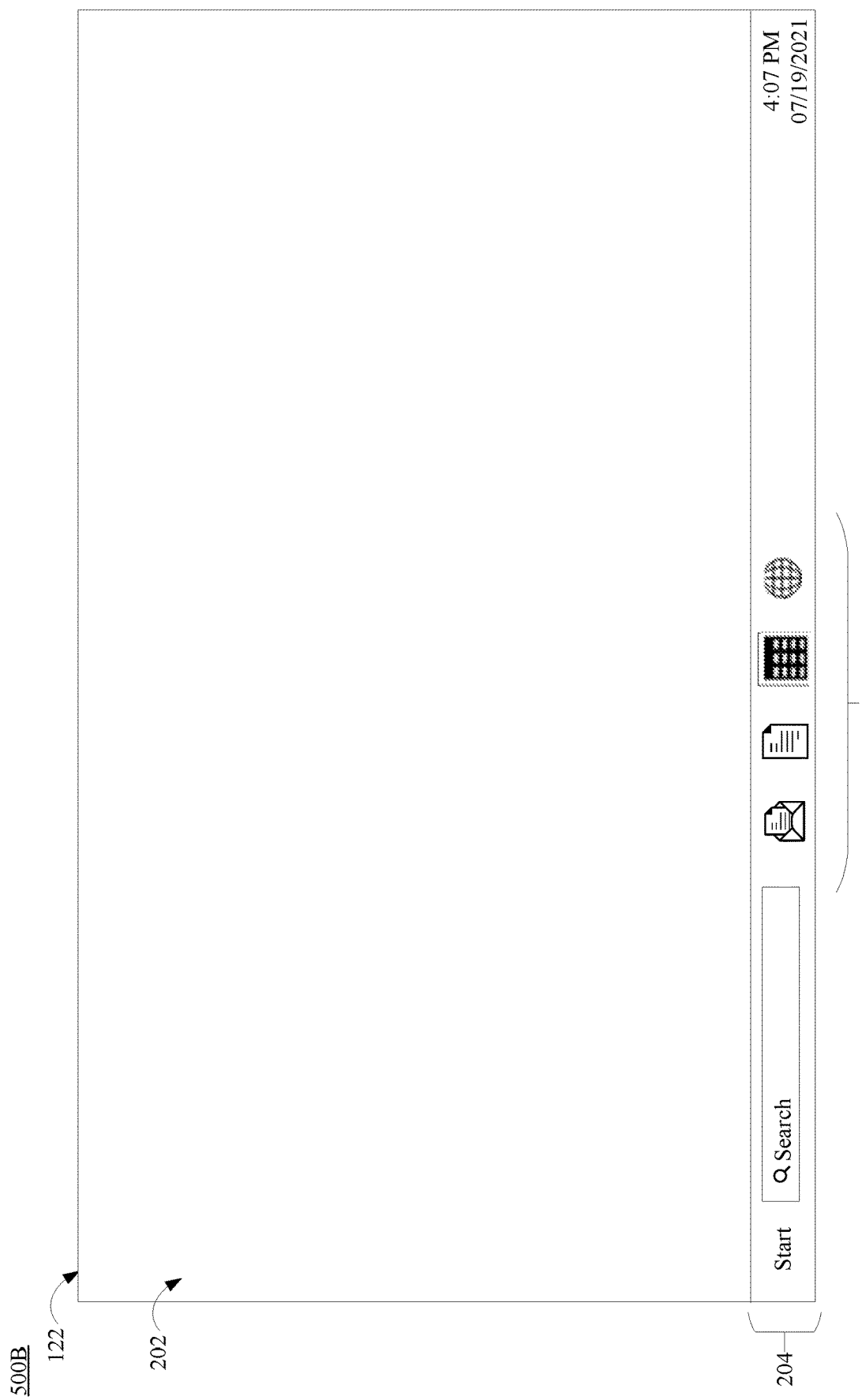

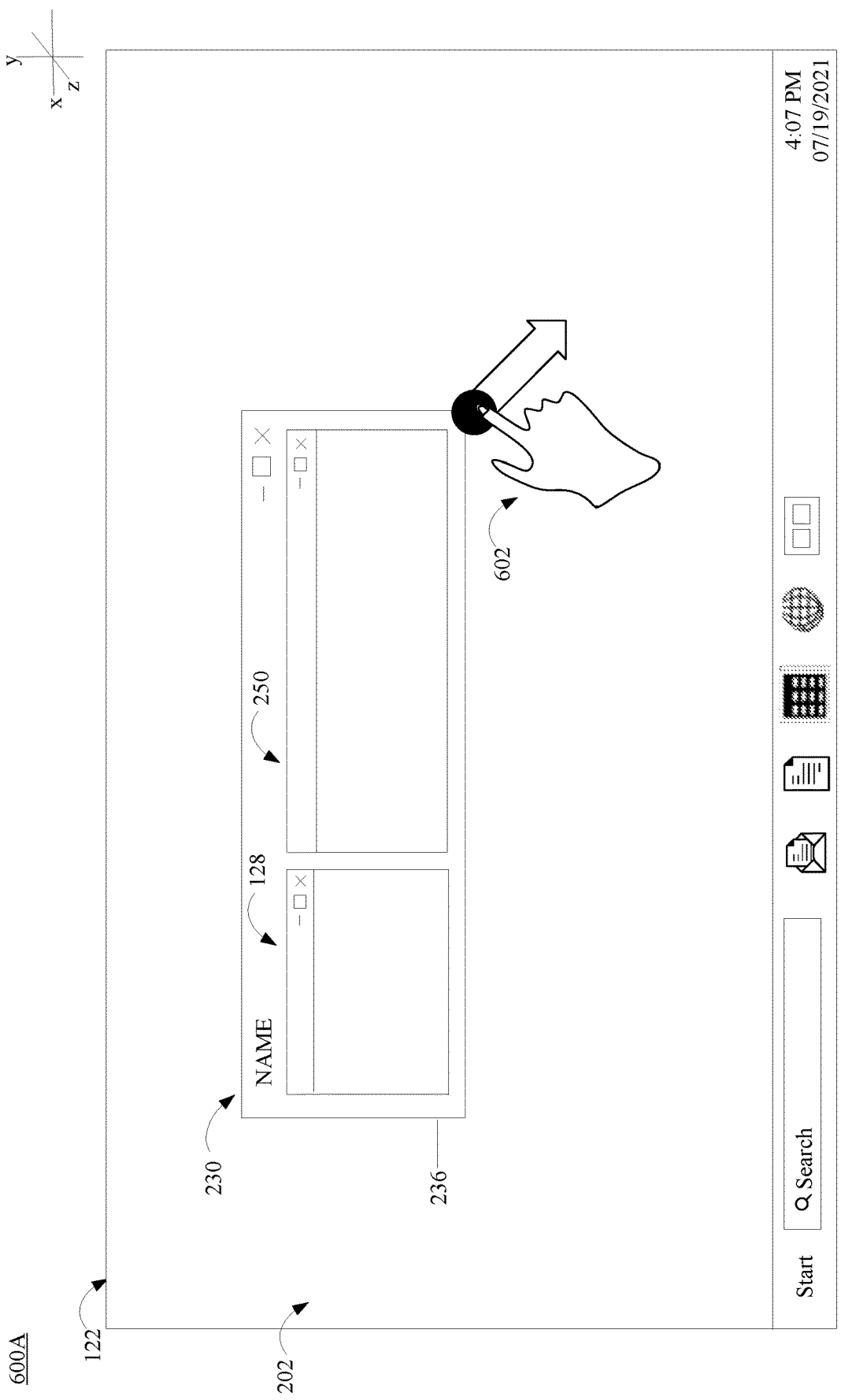

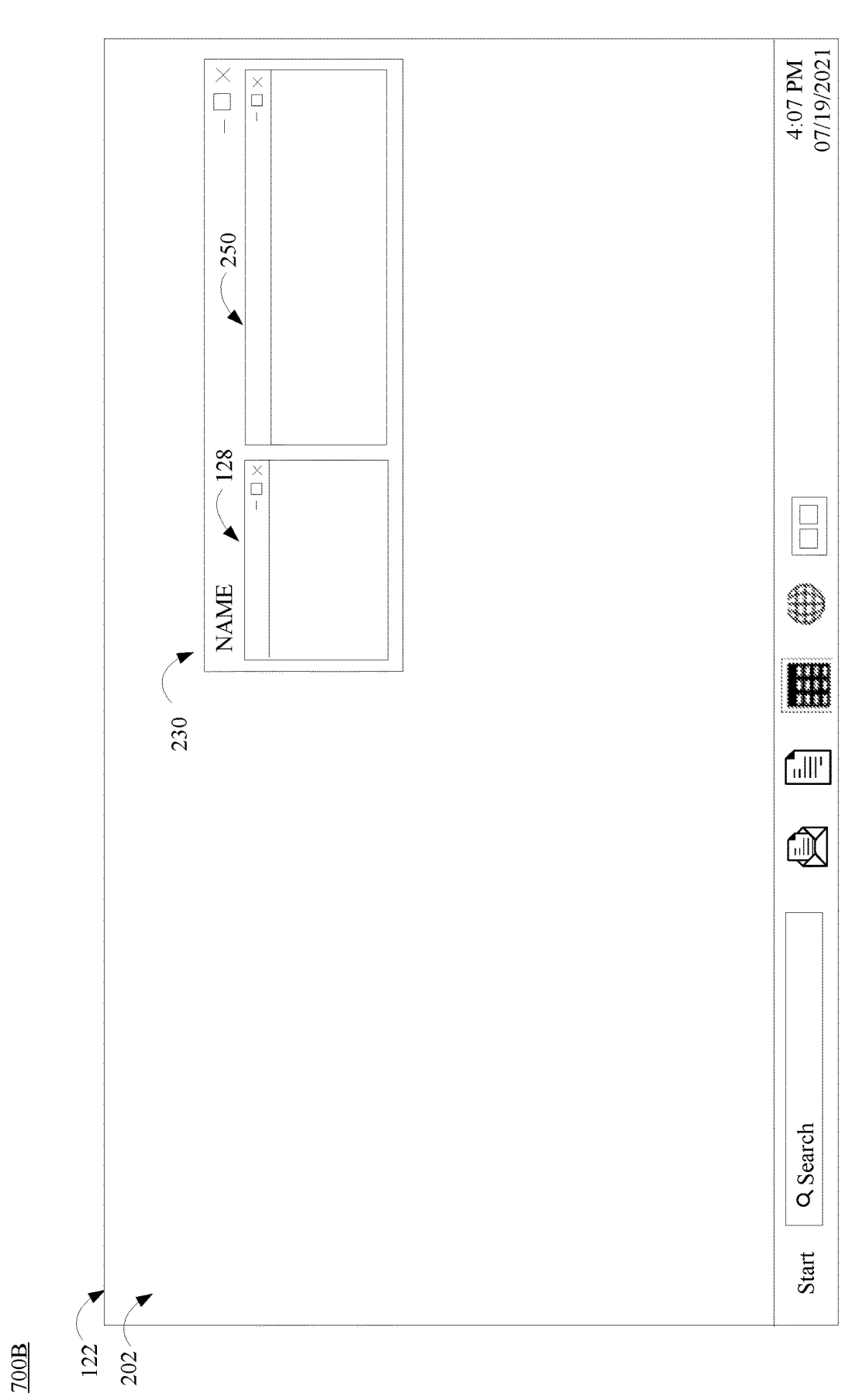

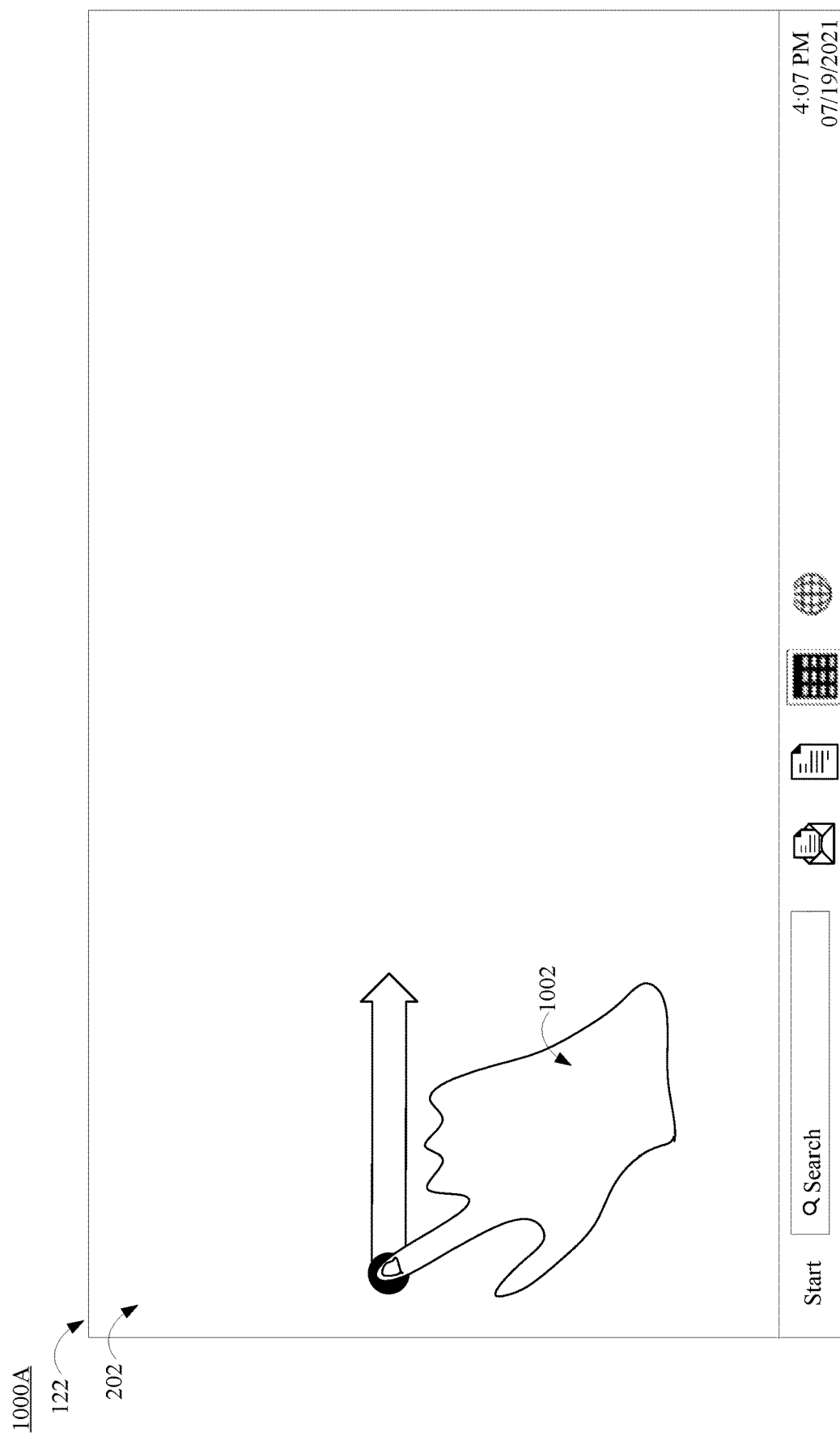

WINDOWING CONTAINER

CROSS-REFERENCE TO RELATED APPLICATIONS

This application is a continuation of U.S. application Ser. No. 17/464,424 filed Sep. 1, 2021, entitled "Windowing Container," which application is incorporated herein by reference and a claim of priority is made.

BACKGROUND

A user may access and interact with multiple different applications concurrently via a user interface of an operating system that is executing the applications on the user's computing device. For example, to enable interaction with each application, a respective window may be opened for display on the user interface. As the number of applications concurrently accessed and interacted with increases, the user interface may become increasingly cluttered as the windows associated with each of the different applications begin to overlap and occupy the entire (or a significant portion of) display space. This occurrence is particularly problematic in handheld devices with smaller screen sizes.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for a windowing container. The windowing container may enable two or more windows associated with application(s) to be grouped within the container such that the windows may behave or function uniformly as a single window. For example, at least two windows may be opened for display on a user interface of an operating system to enable a user to interact with one or more applications executed by the operating system. In some examples, each of the two windows may be associated with a different application (e.g., a first and second application). In other examples, each of the two windows may be associated with a different instance of the same application. A request may be received to group these two windows, and a container may be generated. The container may include the windows arranged based on one or more rules and features enabling group functions associated with the container to be performed. A request to perform one of the group functions may be received, and the group function associated with the container may be performed causing the windows arranged therein to behave uniformly as a single window in accordance with the group function.

As the windows are grouped and arranged within the container, the windows may be automatically sized and positioned within the container based on the one or more rules. The windows may also be automatically resized and positioned as new windows are grouped within or existing windows are released from the container. Further, a state of the container may be stored to enable subsequent invocation of the container in accordance with the stored state after the container has been closed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 3C depicts minimization of the container in FIG. 3A or FIG. 3B.

FIG. 5B depicts a closing of the container in FIG. 5A.

FIG. 6A depicts one example input type to resize a container.

FIG. 7B depicts the repositioned container of FIG. 7A.

FIG. 10A depicts one example input type to invoke a stored container.

DETAILED DESCRIPTION

Figure 1:
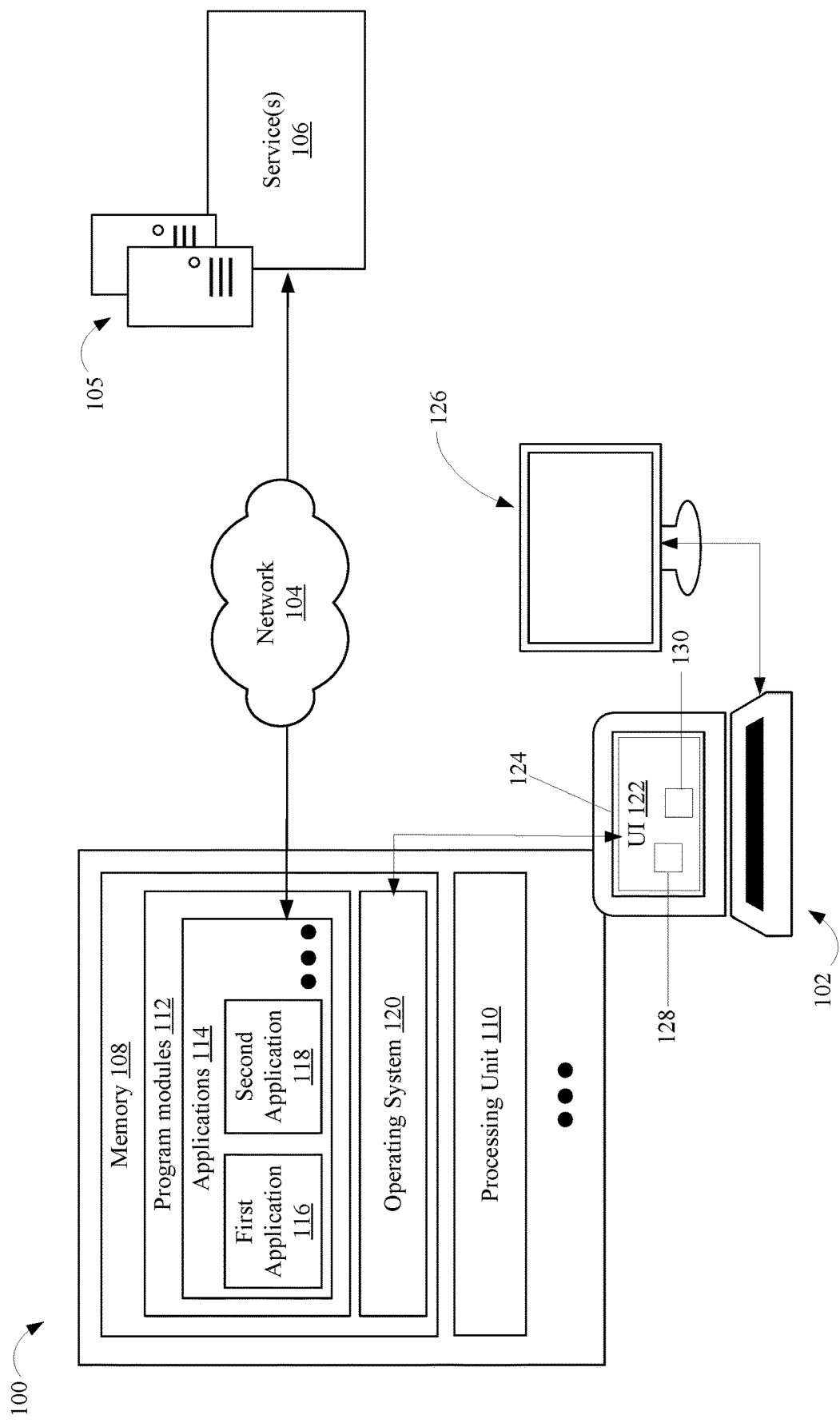
FIG. 1 illustrates an overview of an example system for implementation of the windowing container.

As briefly discussed above, users may interact with multiple different applications executed by an operating system via respective windows displayed on a user interface of the operating system. As the number of applications concurrently accessed and interacted with increases, the user interface may become increasingly cluttered as the windows associated with each of the different applications begin to overlap and occupy the entire (or a significant portion of) display space. This occurrence is particularly problematic in handheld devices with smaller screen sizes. To mitigate the clutter, users have to spend time and effort in resizing and repositioning each window relative to one another to organize the windows in a manner that best suits their workflow.

Examples of the present disclosure describe systems and methods for a windowing container to automate and improve organization of windows on the operating system user interface. The container may enable two or more windows associated with one or more applications that are displayed on the user interface of the operating system to be grouped within the container such that the windows may behave or function uniformly as a single window. For example, performance of group functions enabled by features of the container, such as minimizing, maximizing, restoring, closing, resizing, snapping, or repositioning the container, may cause the function to be performed on each of the windows arranged therein. Therefore, a single input associated with the container received via the user interface may cause performance of the function on each of the windows grouped within the container, rather than requiring several inputs (e.g., one input for each window) to individually perform the function on each window. Based on the reduction in the number of inputs received to perform a same function, processing resources utilized to process and understand those inputs may be conserved.

As the windows are grouped and arranged within the container, the windows may be automatically sized and positioned within the container based on one or more rules. The windows may also be automatically resized and repositioned as new windows are grouped within or existing windows are released from the container. In addition to saving the user the time and effort of manual arrangement, this rule-based automatic arrangement enables the windows within the container to be aligned pixel-by-pixel, which, as discussed in more detail below, avoids dead space or accidental overlap that often results from manual arrangement. This allows a maximized display space to be utilized for each and every window within the container, while also conserving (e.g., preventing the waste of) user interface display area on an output device. Additionally, one or more states of the container may be stored and accessible for subsequent invocation by a user such that the user may quickly and easily return to the container at a later time, thereby improving user efficiency and interactivity with the operating system user interface.

Accordingly, the present disclosure provides a plurality of technical benefits including, but not limited to, an improved operating system user interface for computing devices that provides and stores states of a container in which two or more windows may be grouped to enable the two or more windows to behave as a single window. The container enables performance of group functions via one input to the container, rather than requiring multiple inputs to each window that reduces processing resources, to improve the functionality of the computing device. Additionally, the specific and particular manner in which the windows are arranged within the container may maximize display space within the container and conserve user interface display area on an output device, which is particularly critical for smaller screen devices such as smart phones. Further, by storing the state of the container, subsequent invocation of the container in accordance with the stored state is enabled to improve interactivity with the operating system user interface.

FIG. 1 illustrates an overview of an example system 100 wherein a windowing container may be implemented. In some aspects, system 100 comprises a client computing device 102, a network 104, and one or more cloud-based services 106 (hereinafter referred to as services 106) that may each be hosted by one or more servers 105. The services 106 may include productivity services (e.g., word processing, presentation, spreadsheet, note-taking, document management and collaboration services), search services, storage services, and virtual desktops, among other service types. In some examples, at least a portion of the services 106 may be associated with and capable of interacting with one another. For example, the portion of the services 106 may be provided by a same service provider or affiliated service providers to enable varying levels of integration.

In some aspects, the services 106 may be hosted by one or more datacenters. The datacenters may include multiple computing devices (e.g., servers) that operate a plurality of virtual machines. A virtual machine may be an isolated software container that has an operating system and an application, similar to the device described below in FIG. 14. In some examples, each of the services 106 may be a separate logical entity operated or executed independently of one another (e.g., executed by a separate virtual machine in a same or different datacenter). In other examples, one or more of these services 106 may be operated or executed by a same virtual machine. In further examples, one or more of these services may be operated or executed by other components (e.g., by one or more servers in a distributed environment). One of skill in the art will appreciate that the scale of systems such as system 100 may vary and may include additional or fewer components than those described in FIG. 1.

Examples of the client computing device 102, include, but are not limited to, personal computers (PCs), server devices, mobile devices (e.g., smartphones, tablets, laptops, personal digital assistants (PDAs)), and wearable devices (e.g., smart watches, smart eyewear, fitness trackers, smart clothing, body-mounted devices). The client computing device 102 may include a memory 108 and a processing unit 110, among other components described in more detail with reference to FIG. 14. The memory 108 may include one or more program modules 112 suitable for running applications 114, including at least a first application 116 and a second application 118. The memory 108 may also include an operating system 120 that controls operation of the client computing device 102 by managing hardware components and software resources to, among other things, support and enable execution of the applications 114 executed by the program modules 112. For instance, the operating system 120 may control the execution of the applications 114 on the processing unit 110.

In some examples, the applications 114 may be associated with respective services 106, and the client computing device 102 may be capable of accessing the services 106 over a network, such as network 104, through the applications 114 that are associated with the respective services 106. The client computing device 102 may execute a thin version of the applications 114 (e.g., a web application running via a web browser) or a thick version of the applications 114 (e.g., a locally installed application) on the client computing device 102. Examples of the network 104 over which the client computing devices 102 access the plurality of services include, but are not limited to, personal area networks (PANs), local area networks (LANs), metropolitan area networks (MANs), and wide area networks (WANs).

A user interface 122 of the operating system 120 may allow user interaction with the client computing device 102. For example, the user interface 122 may request services from the operating system 120 to acquire data from input devices (e.g., a keyboard, a mouse, a touchpad, a pen, a sound or voice input device, a touch or swipe input device) and to display content on output devices, such as a screen 124 of the client computing device 102 or on another display device communicatively coupled to the client computing device 102, such as monitor 126.

In some examples, in response to a user interacting with the user interface 122 to open one or more applications 114, a user interface of each application may be opened into a separate window on the user interface 122 for display to the user via the one or more output devices. In other examples, in response to a user interacting with the user interface 122 to open one or more content items, each content item may be displayed in a user interface of a respective application used to author, view, edit, or access the content item. For example, the content items may include documents, images, video, audio, media, or other similar items. The user interface of the respective application may be opened into a separate window on the user interface 122 for display to the user via the one or more output devices.

As illustrated herein, a first window 128 and a second window 130 may be opened on the user interface 122 for display on the screen 124 of the client computing device 102. The first window 128 and second window 130 may be associated with one or more of the applications 114 that are executing on the client computing device 102. In some examples, the first window 128 and the second window 130 may be associated with at least two applications. For instance, the first window 128 may be associated with the first application 116 and the second window 130 may be associated with the second application 118, where the first application 116 may be a different application than the second application 118. As one illustrative example that will be continued throughout the disclosure, the first application 116 may be a word processing application through which the user is drafting a document to highlight features of a product or service to be offered by an organization associated with the user (e.g., the user's employer). The second application 118 may be a document management and collaboration application connected to an account of the organization, for example, through which the user is searching for and accessing organizational documents associated with the product or service to aid the user in drafting the document. In other examples, the first window 128 and the second window 130 may be respectively associated with a first instance and a second instance of the same application (e.g., first and second instances of the first application 116 or first and second instances of the second application 118). For example, the first window 128 may enable the user to interact with a first content item accessible via an application and the second window 130 may enable the user to interact with a second content item accessible via the same application.

The user interface 122 of the operating system 120 may provide the user with the means for manipulating the one or more applications 114 graphically, by allowing for individual operations (e.g., opening, closing, minimizing, maximizing, restoring repositioning, resizing, snapping) for each of the first window 128 and the second window 130, as well as switching focus between the first window 128 and the second window 130. Each of the first window 128 and the second window 130 may have a predefined size (e.g., a minimum pixel size and a maximum pixel size). In some examples, the predefined size is based on the type of application associated with the window.

As the number of applications 114 concurrently accessed or interacted with increases (e.g., if a third application, fourth application and so on are opened and interacted with), the user interface 122 may become increasingly cluttered. For example, the windows associated with each of the applications 114 may begin to overlap with one another and occupy larger amounts of display space on the screen 124, particularly in handheld devices with smaller screen sizes. Resizing and repositioning each window relative to one another to organize the windows in a manner that best suits the user's workflow can be time and effort consuming.

Additionally, when windows overlap and the user performs manual repositioning to mitigate overlapping (e.g., by graphically manipulating the windows in the user interface 122), the user's manual repositioning may result in at least a portion of pixels of two or more windows continuing to overlap. Overlapping affects which windows are in focus, which may negatively affect a speed at which the applications 114 are rendered. For example, if the first window 128 and the second window 130 are slightly overlapping, and the first window 128 is on top of the second window 130 based on their z-order along the z-axis of the user interface 122, the second window 130 may have a portion of its pixels occluded (e.g., not displayed). Resultantly, the second application 118 associated with the second window 130 may not render as quickly or as often as the first application 116 or, in other examples, the second instance of one of the applications 114 associated with the second window 130 may not render as quickly or as often as the first instance of the same one of the applications 114 associated with the first window 128. Alternatively, the user's manual repositioning to mitigate overlapping may instead result in additional pixel space (e.g., dead space) between the windows. This is particularly likely to occur when the output device has a high-density pixel display. The dead space prevents efficient utilization of the display area of the output device.

Further, if the user pauses their interactions with the client computing device 102 (e.g., at a break time, at the end of the day, when switching from a workstation to a home office station), the application windows may be individually closed, particularly if the user is powering down or will have to restart the client computing device 102. As a result, to return to their previous workflow, the user may have to spend the additional time to individually reopen, resize, and reposition the application windows of interest upon resuming their interactions with the client computing device 102.

Aspects of this disclosure are directed to a container that enables at least two windows to behave or function as a single window (e.g., as a group). For example, and as described in greater detail in the Figures below, the container may be a window that is generated upon receipt of an input indicating to group at least two windows. The two windows may be associated with one or more applications. In some examples, the two windows may be associated with two different applications. In other examples, the two windows may be associated with two instances of a same application. Along with the windows, which may be automatically sized and positioned within the container based on one or more rules, the container may have a plurality of features that can be interacted with to perform a plurality of functions associated with the container. At least a subset of the plurality of functions include group functions. These group functions may include the same or similar functions that can be performed on individual windows, such as opening, closing, minimizing, maximizing, restoring, repositioning, resizing, and snapping. However, a single input corresponding to a group function associated with the container may result in the function being performed on each of the container and the windows arranged therein as if the windows were a single window. Additionally, the user may request to group one or more additional windows to or release existing windows from the container. In response to an addition or release of a window, the container and/or the windows within the container may be automatically rearranged (e.g., resized and/or repositioned) based on the set of rules. In some examples, the container may also be automatically (re)named.

Using the set of rules for the automatic arrangement or rearrangement of windows within the container, the windows may be sized and positioned and/or resized and repositioned in the container such that the windows are aligned pixel-by-pixel along at least one axis of the display to avoid window overlap or dead space. Additionally, one or more states of the container may be stored and accessible for subsequent invocation by a user such that the user may quickly and easily return to the container at a later time improving user efficiency and interactivity with the client computing device 102.

While the specific examples provided in this disclosure describe windows associated with applications that may be grouped together to behave as a single window within the container, it is not so limited. In other examples, windows associated with two or more widgets (e.g., widget windows configured to look and behave differently than default application windows) may be similarly grouped together to behave as a single window within the container. However, because the sizing among widgets may be more standardized (e.g., predefined rather than variable based on application type), the set of rules utilized for sizing and positioning the windows associated with the widgets may be less complex than the set of rules described in detail herein. As one specific example, sizing among widgets windows may be fixed without the option to be resized automatically by the system or manually by the user. In other examples, rules utilized for sizing the widget windows may be based on specified sizing behaviors for the widget windows. In further examples, a combination of windows associated with applications and windows associated with widgets may be grouped together to behave as a single window within the container.

Figure 14:
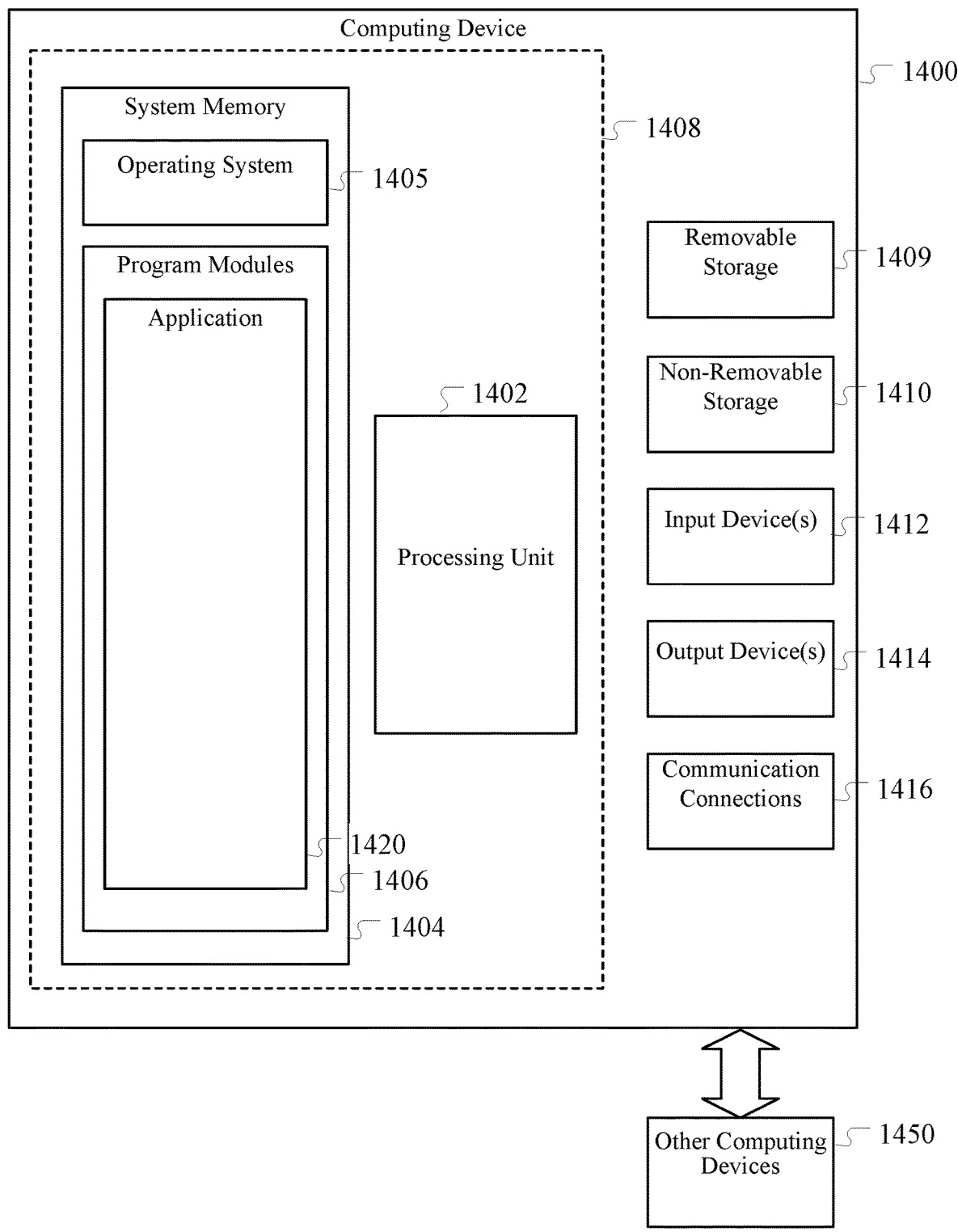
FIG. 14 is a block diagram illustrating example physical components of a computing device with which aspects of the disclosure may be practiced.

Example system 100 as presented is a combination of interdependent components that interact to form an integrated whole. Components of the system 100 may be hardware components or software components implemented on and/or executed by hardware components of the system 100. In some examples, the components of the system 100 disclosed herein may be distributed across multiple devices. For instance, applications running on client computing devices, such as applications 114 running on the client computing device 102, may be utilized to access other devices in a network, such as one or more remote servers 105, that enable access to the hosted services 106. FIG. 14 provides example processing devices of the system 100, such as the client computing device 102 and the remote servers 105.

Figure 11A:
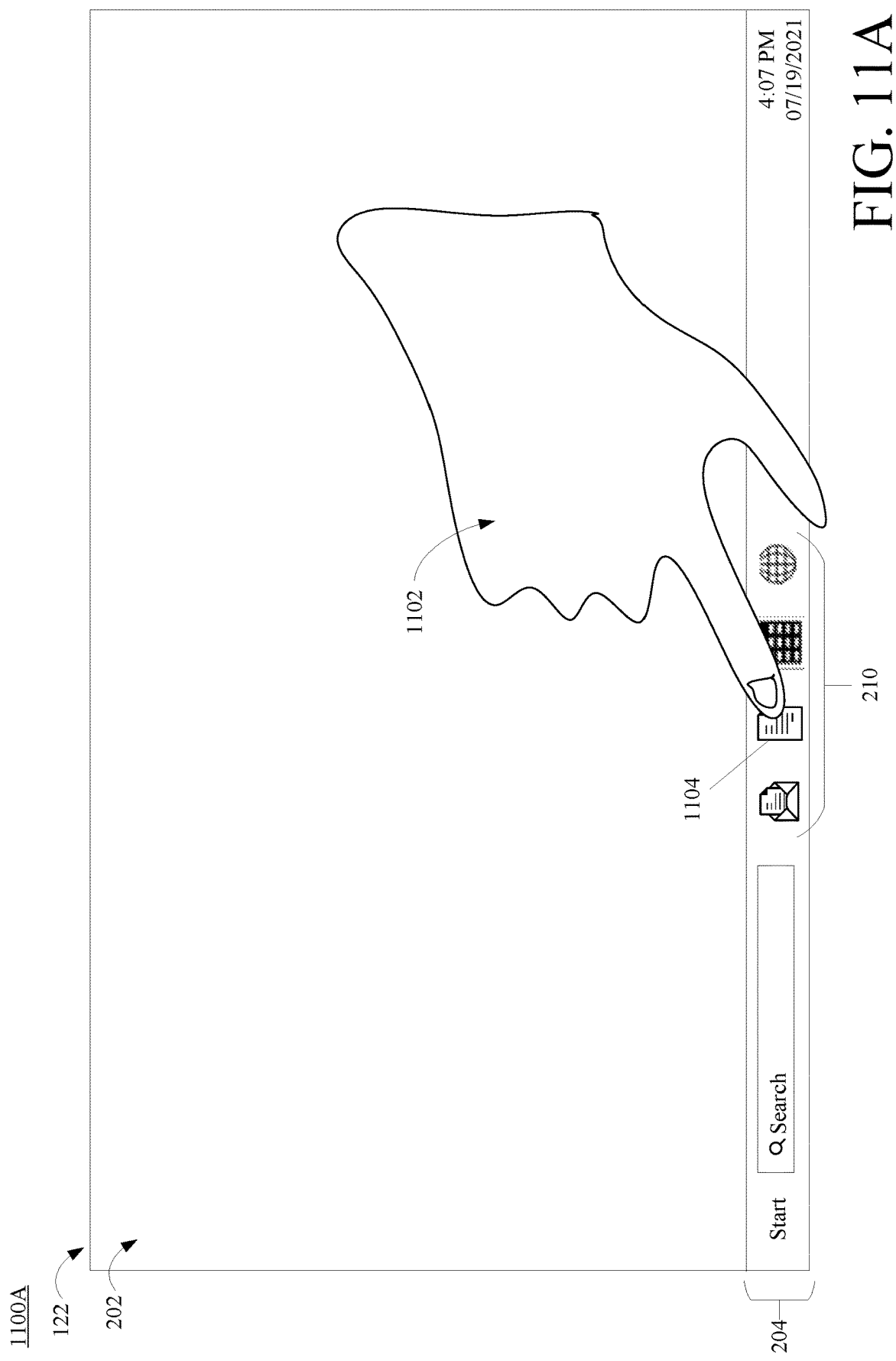
FIG. 11A depicts another example input type to invoke a stored container.
Figure 11B:
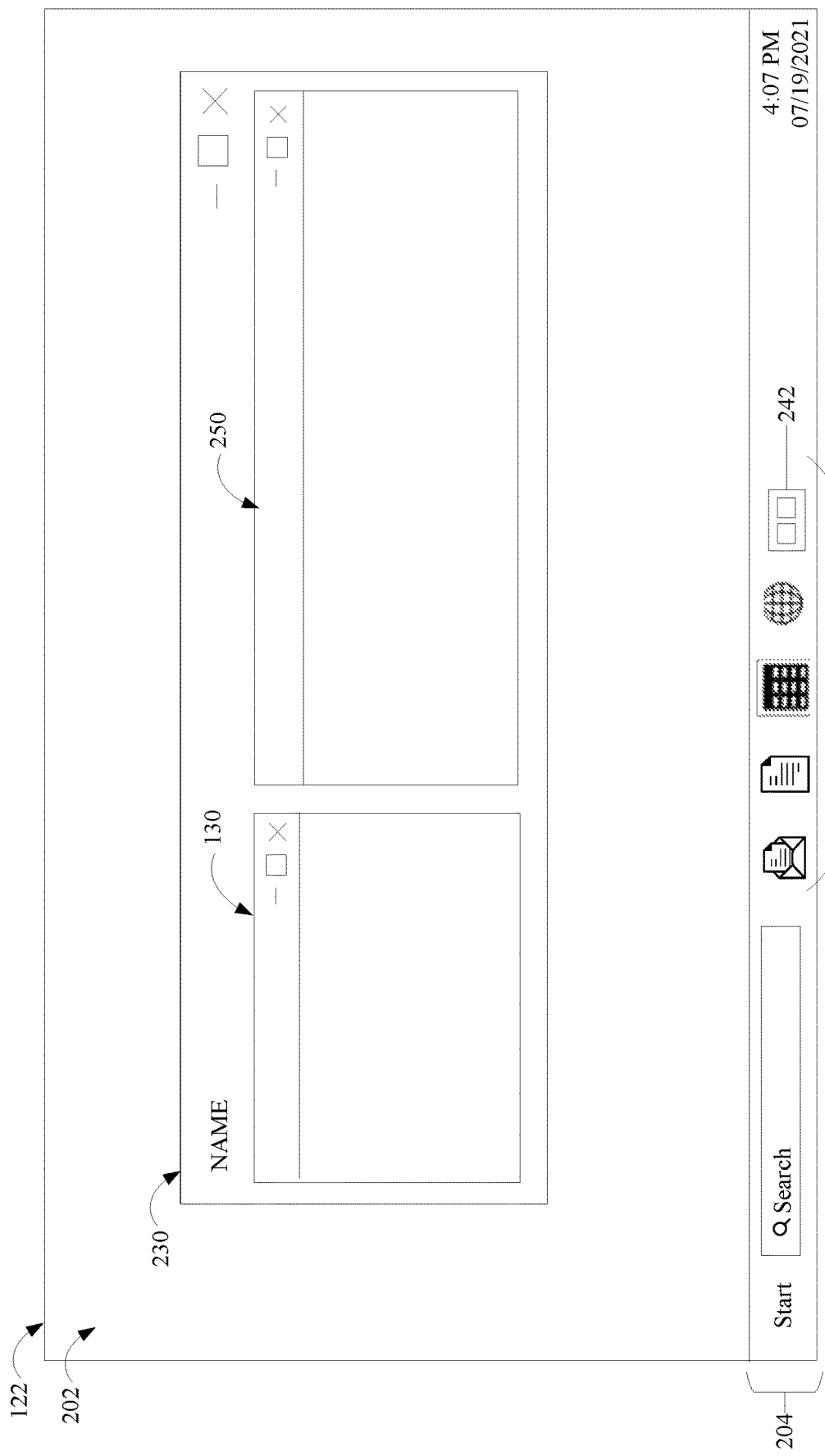
FIG. 11B depicts the invoked container.
Figure 12:
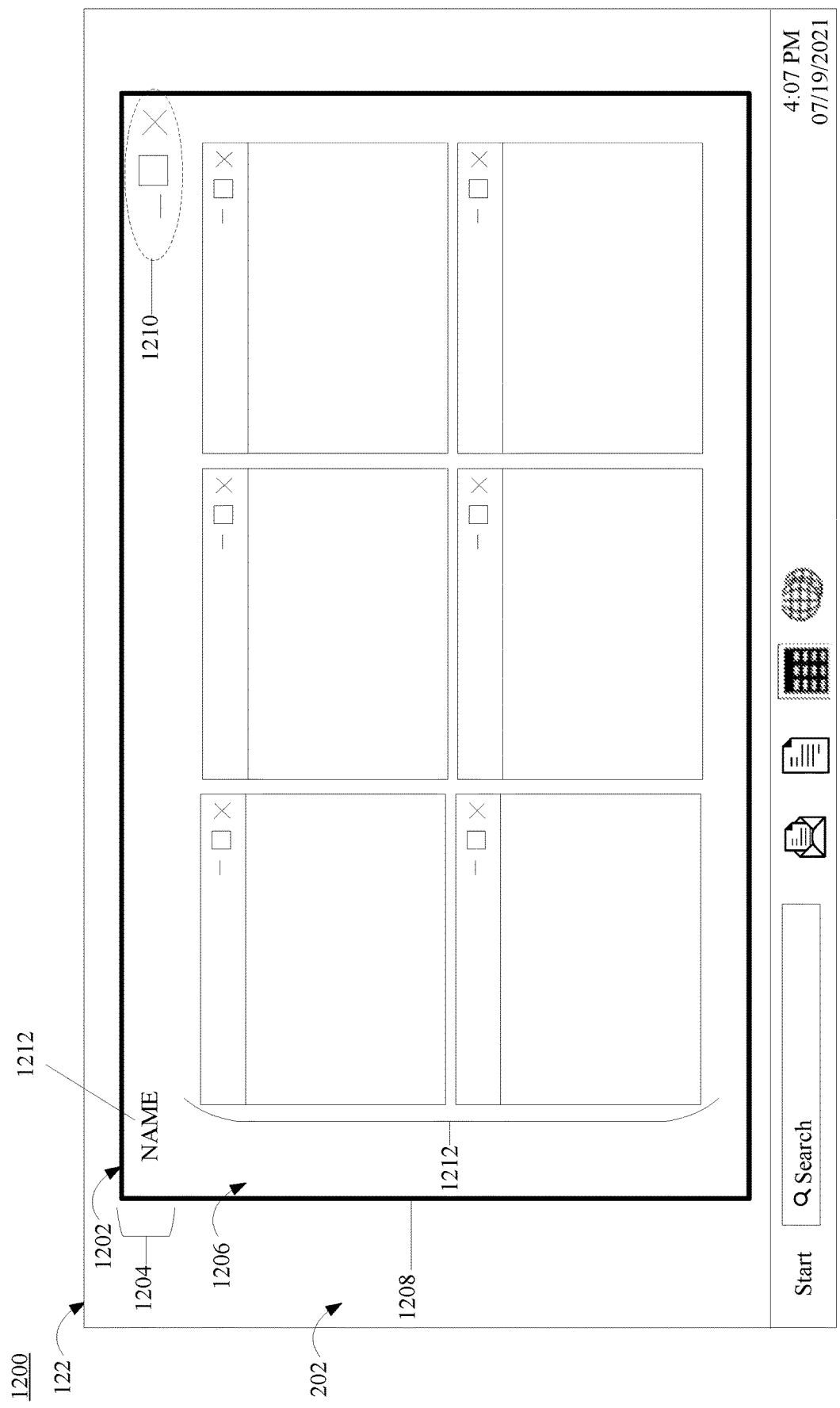
FIG. 12 depicts an example user interface illustrating a default container.
Figure 13:
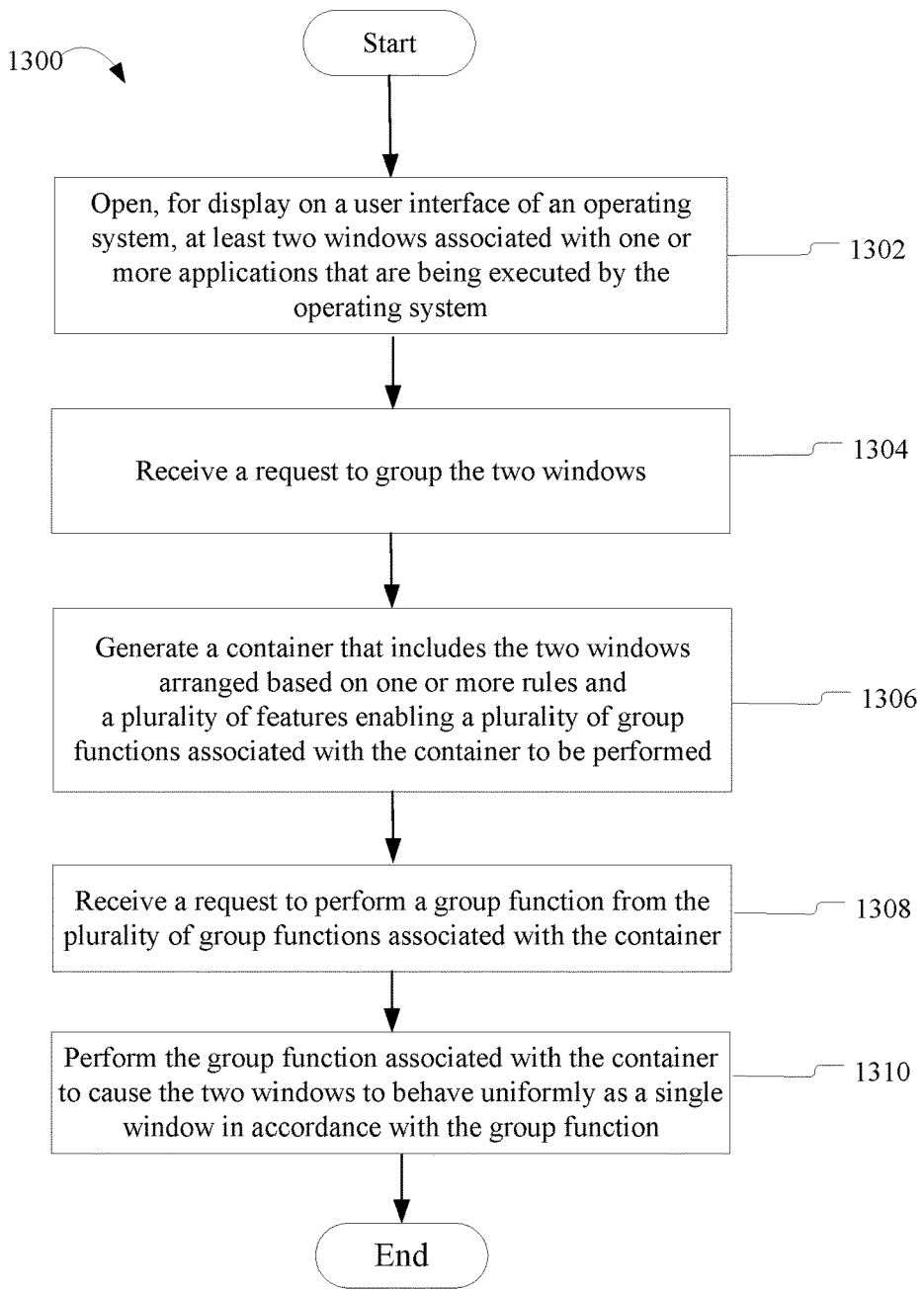
FIG. 13 illustrates an example windowing method.

Having described an example system that may be employed by the aspects disclosed herein, this disclosure will now describe various user interfaces in FIGS. 2A through 12 to illustrate the windowing container and functions thereof, and an example windowing method in FIG. 13 that may be performed by various aspects of the disclosure. In aspects, method 1300 of FIG. 13 may be performed by a system such as system 100 of FIG. 1. However, method 1300 is not limited to such examples.

FIGS. 2A to 2G depict example user interface configurations illustrating grouping and ungrouping of windows within a container. The user interface may be an operating system user interface of a computing device, such as the user interface 122 of the client computing device 102. Referring generally to FIGS. 2A to 2G, the user interface 122 may include a work area 202 and a task bar 204. The task bar 204, among other graphical control elements or features, may include a start button 206, a search bar 208 and one or more icons 210. The start button 206 may be a graphical control element that, upon selection, causes a start menu to be rendered for display. Using the start menu, a user may navigate to applications 114 installed on the client computing device 102, as well as access content items stored locally on the client computing device 102, a user account associated with the client computing device 102, and/or settings associated with the client computing device 102. The search bar 208 displayed on the task bar 204 may alternatively be used to search for and navigate to the applications 114, the locally stored content items, the user account information, and settings. The icons 210 displayed on the task bar 204 may represent a respective one or more applications 114 that are at least one of currently executing on the client computing device 102 or have been pinned or added to the task bar 204. Icons 210 that have been pinned to the task bar 204 may remain displayed on the task bar 204 even if the respective applications 114 are closed to enable a user quick access to the applications 114. For example, a user selection of an icon 210 that is pinned to the task bar 204 may cause the operating system 120 to execute, launch, or otherwise provide access to the respective application represented by the selected icon 210.

When a user selects to open one or more of the applications 114 or content items authored, edited, or accessible via the applications 114 using one of the above discussed methods (e.g., via the start button 206, the search bar 208, and/or the icons 210) or another suitable method, a window associated with each of the one or more applications 114 may be opened and rendered for display within the work area 202 on the user interface 122.

Figure 2A:
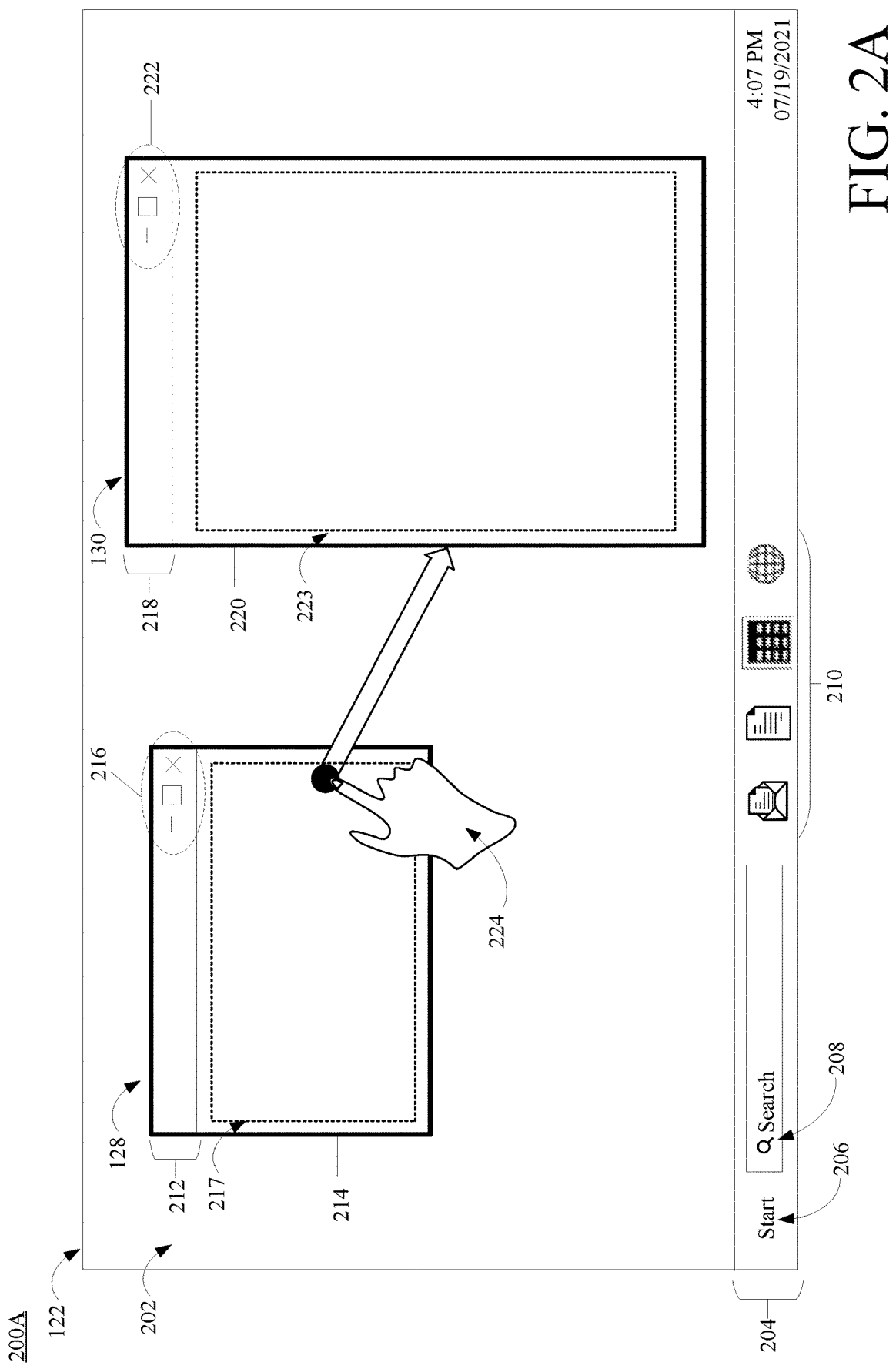
FIG. 2A depicts one example input type received that is indicative of a request to group at least two windows.

FIG. 2A is a user interface diagram 200A depicting one example input type received that is indicative of a request to group at least two windows displayed on the user interface 122. For example, continuing the illustrative example from FIG. 1, where at least the first application 116 and the second application 118 have been opened, the first window 128 associated with the first application 116 and the second window 130 associated with the second application 118 may be displayed as separate windows within the work area 202 on the user interface 122.

The first window 128 may include a title bar 212 and a border 214 (weighted for emphasis). The title bar 212 may be a graphical control element that includes a plurality of features that can be interacted with via the user interface 122 to perform a plurality of individual functions associated with the first window 128. These individual functions may include at least minimizing, maximizing, restoring if already maximized, closing, snapping, and repositioning the first window 128. At least a portion of these functions, such as minimizing, maximizing, restoring if already maximized, and closing may be visually represented by buttons 216 on the title bar 212. Other of the functions, such as snapping or repositioning, may be performed by selecting a portion of the title bar 212 and moving (e.g., dragging) the first window 128 in a particular direction on the user interface 122.

The border 214 may provide resizing functions by allowing a user to select a side or a corner of the border 214 to resize the first window 128 by dragging the side or corner of the first window 128 in a particular direction. For example, the user may select along one of the top or bottom sides of the border 214 to resize the first window 128 in a vertical direction (e.g., along the y-axis of the user interface 122), where the particular top or bottom side selected and direction (e.g., up or down) in which the selected side is dragged affects whether the first window 128 is made larger or smaller along the vertical direction. The user may select along one of the right or left sides of the border 214 to resize the first window 128 in a horizontal direction (e.g., along the x-axis of the user interface 122), where the particular right or left side selected and direction (e.g., right or left) in which the selected side is dragged affects whether the first window 128 is made larger or smaller along the horizontal direction. The user may select a corner of the border 214 to resize the first window 128 simultaneously and proportionally in a horizontal and vertical direction (e.g., along the x- and y-axes of the user interface 122), where the direction (e.g., outward from or inward to the center of the first window 128) in which the selected corner is dragged affects whether the container is made proportionally larger or smaller along the horizontal and vertical direction.

The first window 128 may also include a workspace 217 through which content items that may be read, authored, and/or edited by the particular application type of the first application 116 may be displayed and further interacted with using functionalities of first application 116. In some examples, at least a portion of the functionalities may be provided in a selectable form within a tool bar or ribbon (e.g., displayed between the title bar 212 and the workspace 217).

The second window 130 may include, among other features, a title bar 218 including buttons 222, a border 220, and a workspace 223 that function the same or similarly to the title bar 212, the buttons 216, the border 214, and the workspace 217 of the first window 128 as described in detail above.

In some scenarios, a user may desire to group the first and second windows 128, 130 such that the first and second windows 128, 130 can behave or function as a single window. One example scenario when grouping may be desirable is when the user plans to concurrently refer to or interact with the first application 116 and the second application 118 as part of the user's workflow to complete a task or project. Continuing the illustrative example described in FIG. 1, the example user task or project may be to author the document associated with the product or service associated with the user's organization. In order to do so, the user may need to search for and access documents or other content items of the organization that include details on the features or specifications of this product or service. Therefore, at least initially in the user's workflow, the first application 116 and second application 118 may be open on the client computing device and interacted with concurrently or alternatingly, where the first application 116 may be the word processing application through which the user is authoring the document and the second application 118 may be the document management and collaboration application connected to the user's organizational account to aid the user in searching for and accessing other content useful in drafting the document.

In some examples, to indicate a request to group at least the first window 128 and the second window 130, a first type of user input 224 may be received in which at least one of the windows (e.g., first window 128 as illustrated) is selected and moved proximate to, inside of, or overlapping the other, unselected window (e.g., the second window 130 as illustrated). For example, the first type of user input 224 may include moving the selected first window 128 to an edge or border 220 of the second window 130. This first type of user input 224 may also be referred to as a grouping gesture, particularly when the user utilizes touch or swipe input to perform the gesture. In response to receiving the first type of user input 224, a container may be generated into which the selected first and second windows 128, 130 may be grouped as shown in FIG. 2C. In other examples, other types of user input may be received to indicate a request to group at least the first window 128 and the second window 130, such as at least a second type of user input described in FIG. 2B.

Figure 2B:
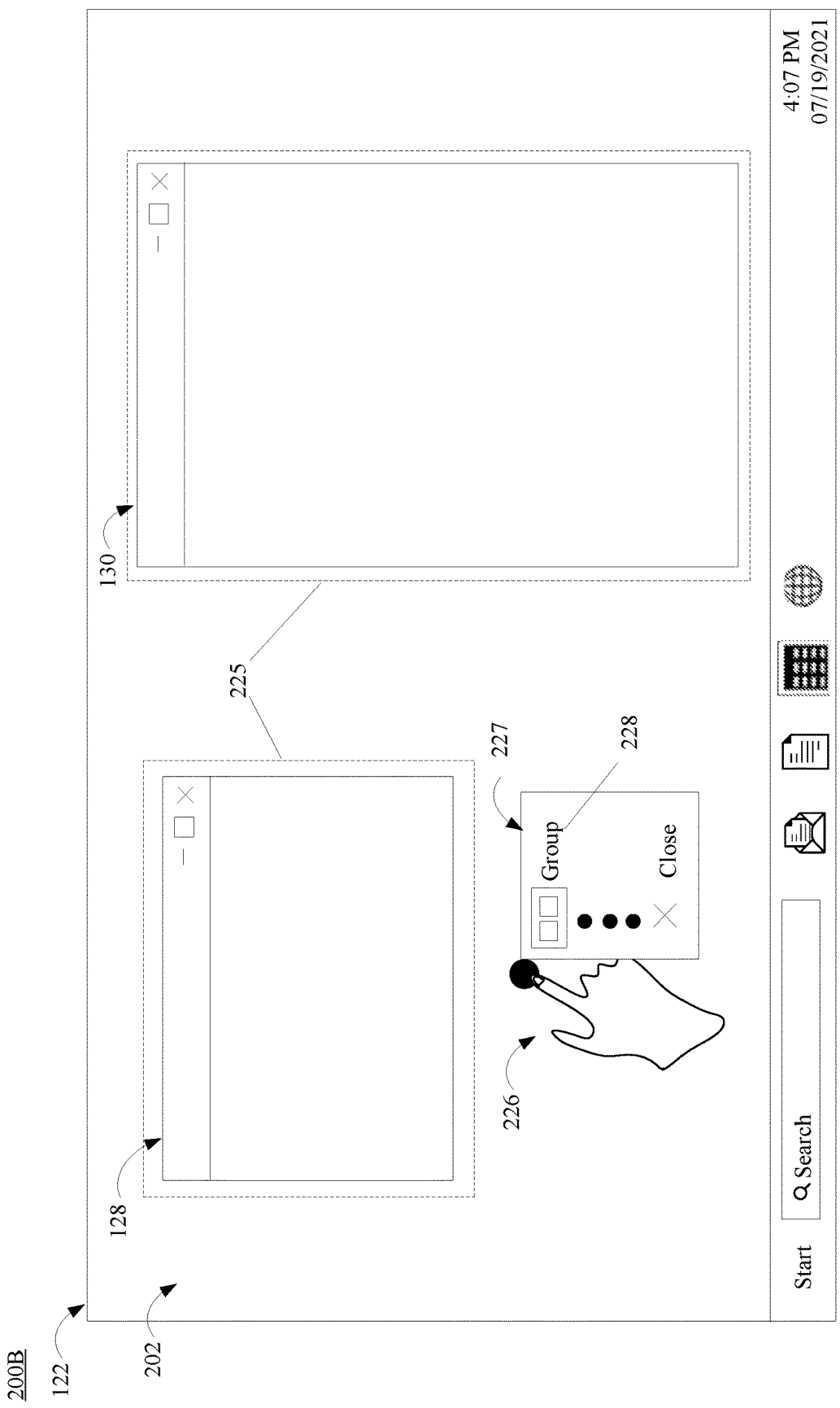
FIG. 2B depicts another example input type received that is indicative of a request to group at least two windows.
Figure 2C:
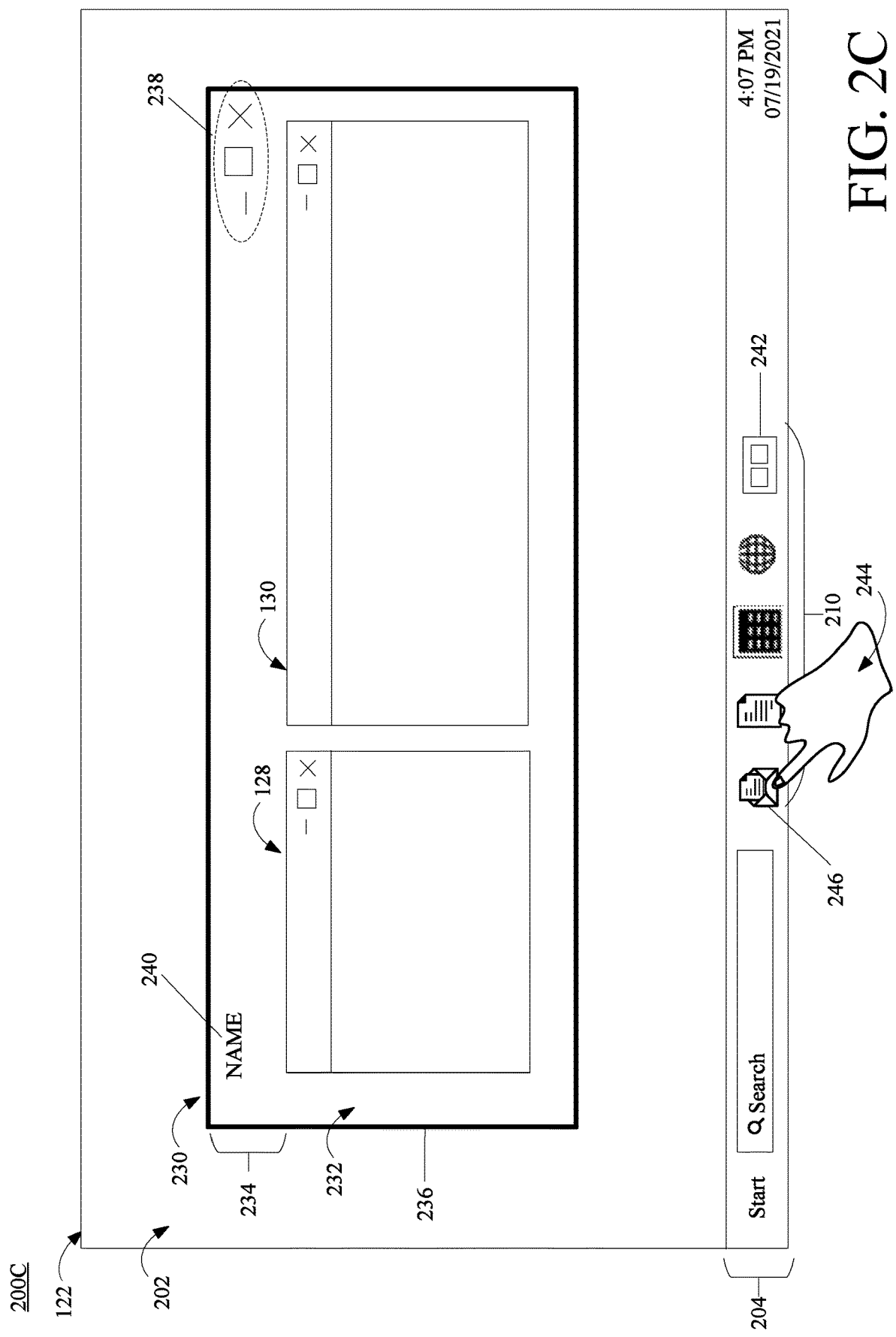
FIG. 2C depicts an example container into which at least two windows are grouped.

FIG. 2B is a user interface diagram 200B depicting another example (e.g., a second) input type received that is indicative of a request to group at least two windows, such as the first and second windows 128, 130 displayed on the user interface 122 of the client computing device 102. The second type of user input may include an initial selection 225 of each of the first and second windows 128, 130 to be grouped, the selection illustrated using the dashed lines. The second type of user input may further include a subsequent selection 226 of at least a portion of the work area 202 of the user interface 122 to cause display of a context menu 227. The context menu 227 may include, among other selectable options, a group option 228 that when selected causes a container 230 to be generated into which the selected first and second windows 128, 130 may be grouped as shown in FIG. 2C.

In addition or alternatively to the input types described above with reference to FIGS. 2A and 2B, in other examples, voice commands may be received via a voice interface supported by the operating system 120 and interpreted to execute the grouping of the first and second windows 128, 130. As one illustrative example, the user may provide the voice command "group windows" causing the container 230 to be generated and all currently displayed or active windows on the user interface 122 to be grouped into the container 230. As another illustrative example, the user may provide a voice command that identifies specific applications, content items, or window titles/names for grouping to cause a subset of the currently displayed or active windows that are associated with the applications, content items, or window titles/names to be grouped into the container 230.

FIG. 2C is a user interface diagram 200C depicting an example container 230.

The container 230 may be generated in response to receiving a request to group at least two windows, such as the first and second windows 128, 130. In some examples, receipt of an input type, such as the first or second input types described above with reference to FIGS. 2A and 2B, may be indicative of the request to group. Once generated, the container 230 may be displayed on the work area 202 of the user interface 122.

The container 230 may be a window that includes a workspace 232 comprising the first window 128 and the second window 130, as well as a title bar 234 and a border 236 (weighted for emphasis) that have associated functionalities for interacting with the container 230. In some examples, the container 230 may be referred to as a board or a floating board.

Generally, the container 230 and the first and second windows 128, 130 comprised therein may form a hierarchy-based windowing system. That is, the windowing system may include different hierarchies or levels, where each level may be associated with a set of functionalities related to controlling at least the respective level itself and, for higher levels, one or more lower levels. As one example, the container 230 may be a higher level having a set of functionalities for controlling each of the first and second windows 128, 130. Each of the first and second windows 128, 130 may be lower levels having individual windowing components or functionalities that enable user interaction with the first and second windows 128, 130.

Within the workspace 232 of the container 230, the first and second windows 128, 130 may be automatically arranged. The automatic arrangement may include a sizing and a positioning of each of the first and second windows 128, 130. The first and second windows 128, 130 and the arrangement thereof within the container 230, among other properties associated with the container 230, may be stored locally on the client computing device 102 to identify a state of the container 230. In some examples, any time properties of the container 230 change, such as the windows and/or arrangement thereof, a new or current state of the container 230 may be stored. In other examples, the state may be stored in response to a closing of the container 230 such that a current state of the container 230 just prior to closing is stored. Storage of the state of the container enables the container to be subsequently invoked and provided for display on the user interface 122, as discussed in detail with reference to FIGS. 10A to 10C.

Arrangement of the first and second windows 128, 130 within the container 230 may be based on a set of rules. The arrangement of the first and second windows 128, 130 may include an automatic sizing and positioning of the first and second windows 128, 130. In some examples, the rules associated with the automatic sizing and positioning may be based in part on a window size for the application type with which the first and second windows 128, 130 are associated. For example, windows for an application type may have a predefined minimum pixel size and a maximum pixel size. A window having a larger minimum pixel size may be prioritized over other windows as a main or primary window within the container 230.

In other examples, the rules associated with automatic sizing and positioning may be based in part on known or learned user preferences for particular application types or content items. For example, preferences may be known based on settings associated with the user account. Alternatively or additionally, preferences may be learned over time from trends in how the user and/or other users similar to the user interact with various different containers having windows associated with particular application types.

In further examples, the rules associated with arrangement of the windows may be based in part on determinations of current usage associated with windows. As one illustrative example, even if the first application 116 may have a larger minimum pixel size for windows than the second application 118, the second window 130 may nonetheless be arranged as a primary window of larger size and/or more prominent position if the user has been interacting with the second application 118 more frequently prior to the grouping of the first and second windows 128, 130 within the container 230. In some examples, current window or application usage may be tracked using functionalities of a tracking program or application installed and executed by the operating system 120. Such usage tracking may also cause a rearrangement of the first and second windows 128, 130 within the container 230 after initial generation (e.g., creating a new state of the container 230). To ensure data privacy, the user may opt-in (with the ability to later opt-out) to activity tracking before such window or application usage is tracked and utilized as part the rules for window arrangement within the container 230. Additionally, when opted-in, the users may be provided within information related to the collection and use of the tracked data, including a capability to correct the data and/or override the data with user preferences.

The rules for window arrangement within the container 230 may also include hierarchies. The hierarchies may relate to at least one or more of size, alignment, and proximity associated with the container 230 and/or the first and second windows 128, 130 included therein. One example size-related hierarchy may be based on an initial size of each window. For example, when a large window is grouped with a smaller window and the container 230 is to be resized, the initial size of each window may be taken into account when deciding which window should be larger as part of the resizing process. That is, the large window may occupy more space in the container than the smaller window based on the decision. One example alignment-related hierarchy may be to maintain as many currently-aligned edges of existing windows within the container 230 as possible when adding a new window to or releasing an existing window from the container 230. One example proximity-related hierarchy may be to arrange two or more windows that are proximate to one another on the user interface 122 prior to grouping adjacently to one another when generating the container 230. Another example proximity-related hierarchy included in the rules may be that once two or more windows are arranged adjacent to one another within the container 230, the adjacency of the two or more windows may be maintained within the container 230 when a new window is added or an existing window is released.

The title bar 234 and the border 236 may have similar features to the title bars 212, 218 of the first and second windows 128,130. For example, the title bar 234 may be a graphical control element that includes a plurality of features that can be interacted with via the user interface 122 to perform a plurality of group functions associated with the container 230. Performance of such a group function may cause each of the first and second windows 128, 130 to behave or function uniformly as a single window in accordance with the function. These group functions associated with the title bar 234 may include at least minimizing, maximizing, restoring if already maximized, closing, snapping, and repositioning. At least a portion of these functions, such as minimizing, maximizing, restoring if already maximized, and closing, may be visually represented by buttons 238 on the title bar 234 of the container 230. Other of the functions, such as repositioning, may be performed by selecting a portion of the title bar 234 to move (e.g., drag) the container 230 from a current, first location to a second location on the user interface 122. Such movement of the container 230 may also include movement across one or more monitors or display screens, as well as movement across virtual desktops.

The border 236 may provide resizing functions by allowing a user to select a side or a corner of the border 236 and drag the container 230 in a particular direction to proportionally resize the first and second windows 128, 130 within the workspace 232 of the container 230. For example, the user may select along one of the top or bottom sides of the border 236 to resize the container 230 in a vertical direction (e.g., along the y-axis of the user interface 122), where the particular top or bottom side selected and direction (e.g., up or down) in which the selected side is dragged affects whether the container 230 is made larger or smaller along the vertical direction. The user may select along one of the right or left sides of the border 236 to resize the container 230 in a horizontal direction (e.g., along the x-axis of the user interface 122), where the particular right or left side selected and direction (e.g., right or left) in which the selected side is dragged affects whether the container 230 is made larger or smaller along the horizontal direction. The user may select a corner of the border 236 to resize the container 230 simultaneously and proportionally in a horizontal and vertical direction (e.g., along the x- and y-axes of the user interface 122), where the direction (e.g., outward from or inward to the center of the container 230) in which the selected corner is dragged affects whether the container is made proportionally larger or smaller along the horizontal and vertical direction.

Specific examples of the above-discussed group functions performed in association with the container 230 are illustrated and described in greater detail in FIGS. 3A to 8B.

Although the first and second windows 128, 130 are grouped within the container 230 and may behave or function as a single window upon a selection of one or more group functions associated with the container 230, each window may also maintain its individual functionalities as described in detail in FIG. 2A. For instance, each window may still be individually minimized, maximized, restored, closed, resized, snapped, or repositioned. In some examples, the individual functionalities may be executed relative to the container 230. As one illustrative example, if a window in the container 230 is individually minimized to allow the user more space to interact with a primary window, for example, a visual representation of the minimized window may be presented within the container 230 to allow the user to more easily access and bring back the previously minimized window. As another illustrative example shown in FIGS. 9A and 9B below, the user may still be enabled to utilize functionalities of the border 214 of the first window 128 to resize the first window 128 within the container 230. In some examples, when the first window 128 is resized, the container 230 and/or the second window 130 may be resized and the second window 130 may additionally or alternatively be repositioned based on the set of rules for arranging grouped windows.

In some examples, the title bar 234 may also include a name 240 associated with the container 230. The name 240 may be automatically populated. In some examples, the name 240 may be determined based on content items or applications associated with the first and second windows 128, 130 in the container 230. For example, the name 240 may be extracted from a title of a content item being authored and/or edited using the first application 116 associated with the first window 128. Continuing the illustrative example where the first application 116 is a word processing application through which the user is authoring a document for a product or service, the title of the document may be extracted for inclusion as the name 240. In another example, the name 240 may be populated based on a derived topic associated with the contents of one or more of the windows 128, 130. For example, if a document being edited in one window is about dogs and another window associated with a web browser is displaying a website about different dog breeds, the document and website may be analyzed to determine that the word "dog" (and synonyms or related terms) appears frequently. Dog may be derived as a topic and included as part of the name 240. In some examples, as new windows are added to the container 230 and/or as existing windows are released, the automatically populated name 240 may be updated. Additionally, the user may be enabled to manually enter the name 240 or change an automatically populated name 240 of the container 230. In some examples, once the user enters or changes the name 240, automatic updates to the name 240 upon addition or release of windows may be disabled. The name 240 may be stored as a property of the state of the container 230.

Also, in some examples, when the container 230 is open on the user interface 122, a grouping icon 242 may be included as one of the icons 210 displayed on the task bar 204 of the user interface 122. Display of the grouping icon 242 may be maintained, even if the container 230 is minimized or otherwise hidden, until the container 230 is closed.

In addition to interacting with the container 230 and the first and second windows 128, 130 therein, the user may select 244 one of the icons 210 from the task bar 204, such as an icon 246 associated with a third application (e.g., one of the applications 114). In some examples, the third application may be currently executing on the client computing device 102 but a third window 250 associated with the third application is hidden from the user interface (e.g., the third window was previously minimized, and thus the icon 246 appears in the task bar 204). In other examples, the third application may be pinned or added to the task bar 204 and thus the icon 246 may be present on the task bar 204 regardless of whether the third application is currently executing on the client computing device 102. When an icon is pinned, a graphical scheme, such as shading, underlining, shadowing, or highlighting, among other examples, may be applied to indicate whether the third application is currently executing on the client computing device 102. Selection 244 of the icon 246 may cause the operating system 120 to execute the third application on the client computing device 102, if not already executing, and open the third window 250 for display on the user interface 122. The third window 250 may be displayed separate from the container 230 as shown in FIG. 2D.

In this illustrative example, the third application may be a communication application for sending and receiving electronic communications. The electronic communications may include electronic mail ("e-mail"), instant messages, SMS messages, and other similar electronic communications. For example, as the user is authoring the document using the first application 116 via the first window 128 and intermittently searching for and accessing supportive content items using the second application 118 via the second window 130, the user may pause and select 244 the icon 246 to open the communication application in order to check for any new electronic communications received and/or to search for a specific electronic communication related to the document, among other examples.

Figure 2D:
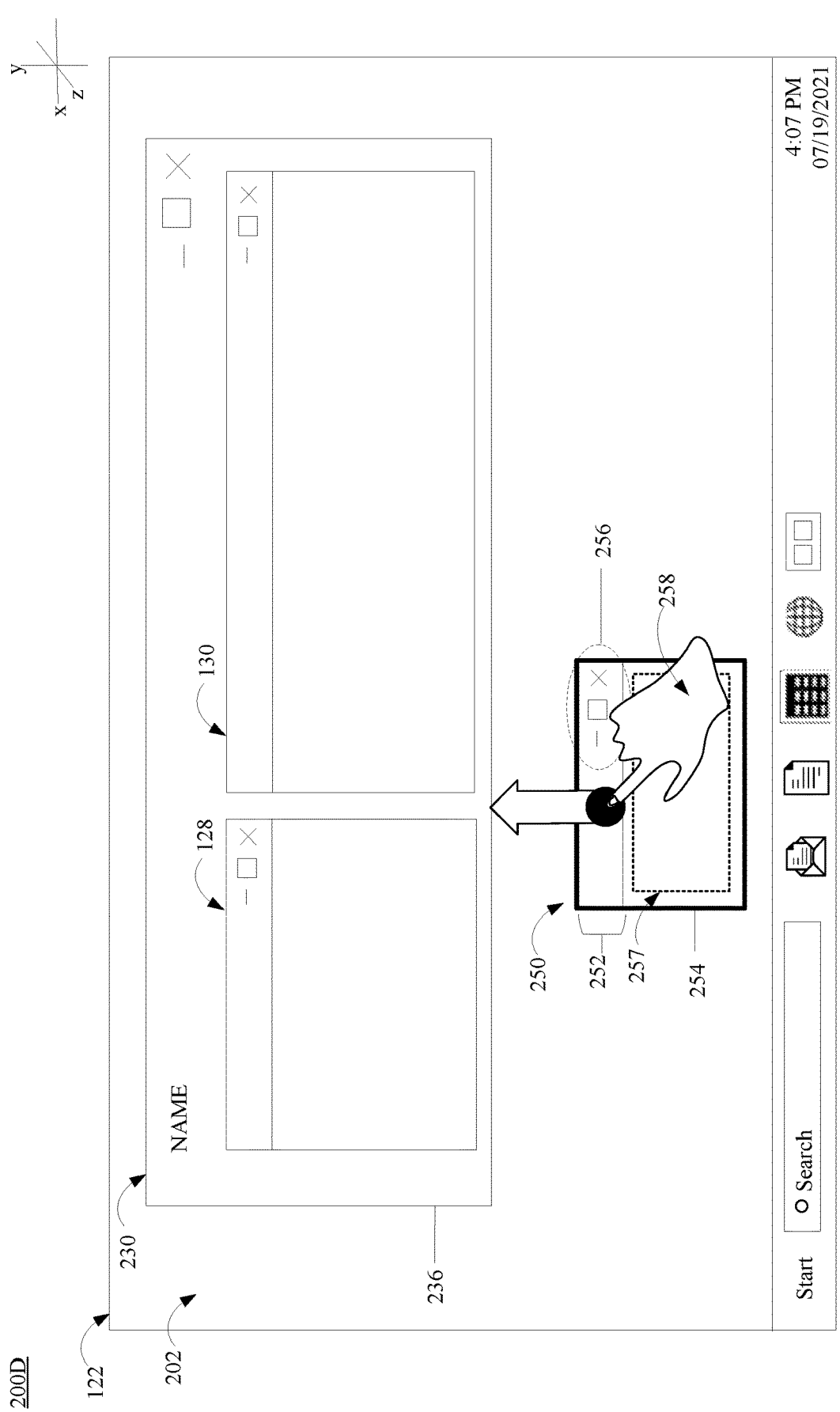
FIG. 2D depicts an example addition of a new window to the container of FIG. 2C.

FIG. 2D is a user interface diagram 200D depicting an example addition of a new window, such as the third window 250, to the container 230. Upon the selection 244 of the icon 246 associated with the third application illustrated in FIG. 2C, the operating system 120 may execute the third application on the client computing device 102, if not already executing, and open the third window 250 on the user interface 122 for display separate from the container 230. The third window 250 may include, among other features, a title bar 252 including buttons 256, a border 254, and a workspace 257 that function the same or similarly to the title bar 212, the buttons 216, the border 214, and the workspace 217 of the first window 128 as described in detail above with reference to FIG. 2A.

In some examples, the container 230 may automatically maintain a forward position in the z-order along the z-axis of the user interface 122 such that the container 230 appears on top of any other windows displayed on the user interface 122 that at least partially overlap with the container 230. For example, if the third window 250 partially overlapped with the container 230, the container 230 may appear on top causing the overlapping portion of the third window 250 to be hidden. An example of this overlapping is shown with reference to FIG. 2G. In other examples, a window (or container) that was most recently opened or interacted with may maintain the forward position in the z-order along the z-axis of the user interface 122.

To add the third window 250 to the container 230 for grouping of the first window 128, the second window 130, and the third window 250, the user may select and move 258 the third window 250 proximate to the container 230. For example, the selected third window 250 may be moved (e.g., dragged) to at least an edge (e.g., the border 236) of the container 230. In some examples, the selected third window 250 may be further moved into the container 230 itself. This selection and movement 258 may be one example form of a request to add or group a new window to an existing container, such as container 230.

Figure 2E:
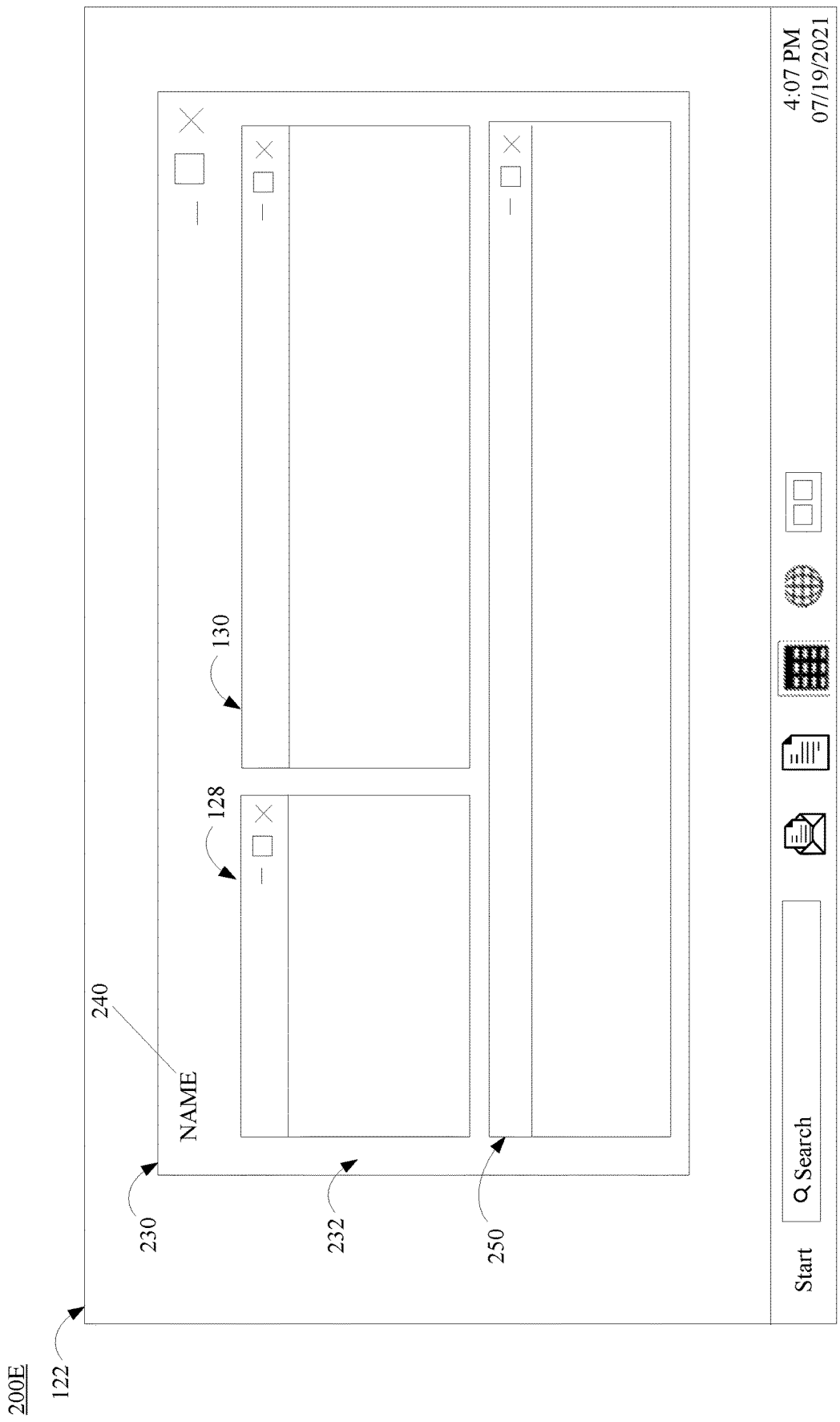
FIG. 2E depicts an example automatic window arrangement within the container to include the new window added to the container in FIG. 2D.

FIG. 2E is a user interface diagram 200E depicting automatic window arrangement upon addition of a new window, such as the third window 250, to the container 230. For example, in response to the addition of the third window 250 to the container 230, the container 230, the first window 128, the second window 130, and the third window 250 may be arranged based on the set of rules (including the hierarchies) described in detail with references to FIG. 2C.

In one example, the container 230 may be a predefined size adjustable by the user, where the first, second, and third windows 128, 130, 250 may be arranged (e.g., based on size and/or position) within the workspace 232 of the container 230 to fit within the predefined size of the container 230. For example, the added third window 250 may be automatically sized and positioned, and the existing first and second windows 128, 130 may be automatically resized and/or repositioned based on a set of rules. In another example, the size of the container 230 may be automatically adjustable to fit each of the first, second, and third windows 128, 130, 250. In a further example, the container 230 may reject the new window added (e.g., the third window 250) if, based on the minimum pixel size of the new window, there is not enough space within the container 230 for the inclusion of the new window. Alternatively, in the scenario where there is not enough space, instead of rejecting the new window, the container 230 may instead eject or release another existing window within the container (e.g., release the first window 128 or the second window 130) to enable space for the new window. The determination of which existing window to eject or remove may be based on current usage associated with windows or associated applications, where the least used or interacted with window over a most recent, pre-defined period of time (e.g., within the last hour) is released. The ejection determination may additionally or alternatively be based on defined user preferences, a most recent or least recent window added to the container 230, and/or a least recent window receiving user content or interaction, etc.

In some examples, once the third window 250 is added and the automatic arrangement has been performed, a current state of the container 230 that identifies the first, second, and third windows 128, 130, 250 and their arrangement within the container 230, among other properties of the container, may be stored locally on the client computing device 102.

Additionally, the name 240 of the container 230 may be automatically updated upon the addition of the third window 250. For example, the name 240 may be updated based on content items or applications associated with the third window 250. Continuing with the illustrative example, initially the title of the document being authored using the first application 116 associated with the first window 128 may be extracted and used as the name 240. Based on the addition of the third window 250 associated with the communication application, and a determination that the content items being viewed therein include electronic communications between the user and a colleague, the name 240 may be automatically updated to further include an indication that this project or task is a collaboration with the colleague. In other examples, if the user had already entered or changed a previous name 240, the automatic updates to the name upon addition of new windows may be disabled. Also, upon the addition of the third window 250, the user may be enabled to manually change the previous name 240 or change the automatically updated name 240 of the container 230. Any manual or automatic updates to the name 240 may be stored as a property of the current state of the container 230.

Additionally, now that the third window 250 is added to the container 230 (e.g., is grouped with the first window 128 and the second window 130), group functions performed in association with the container 230 may affect each of the first window 128, the second window 130, and the third window 250. In other words, the first window 128, the second window 130, and the third window 250 may function or behave as a single window in response to a group function being performed in association with the container 230.

Figure 2F:
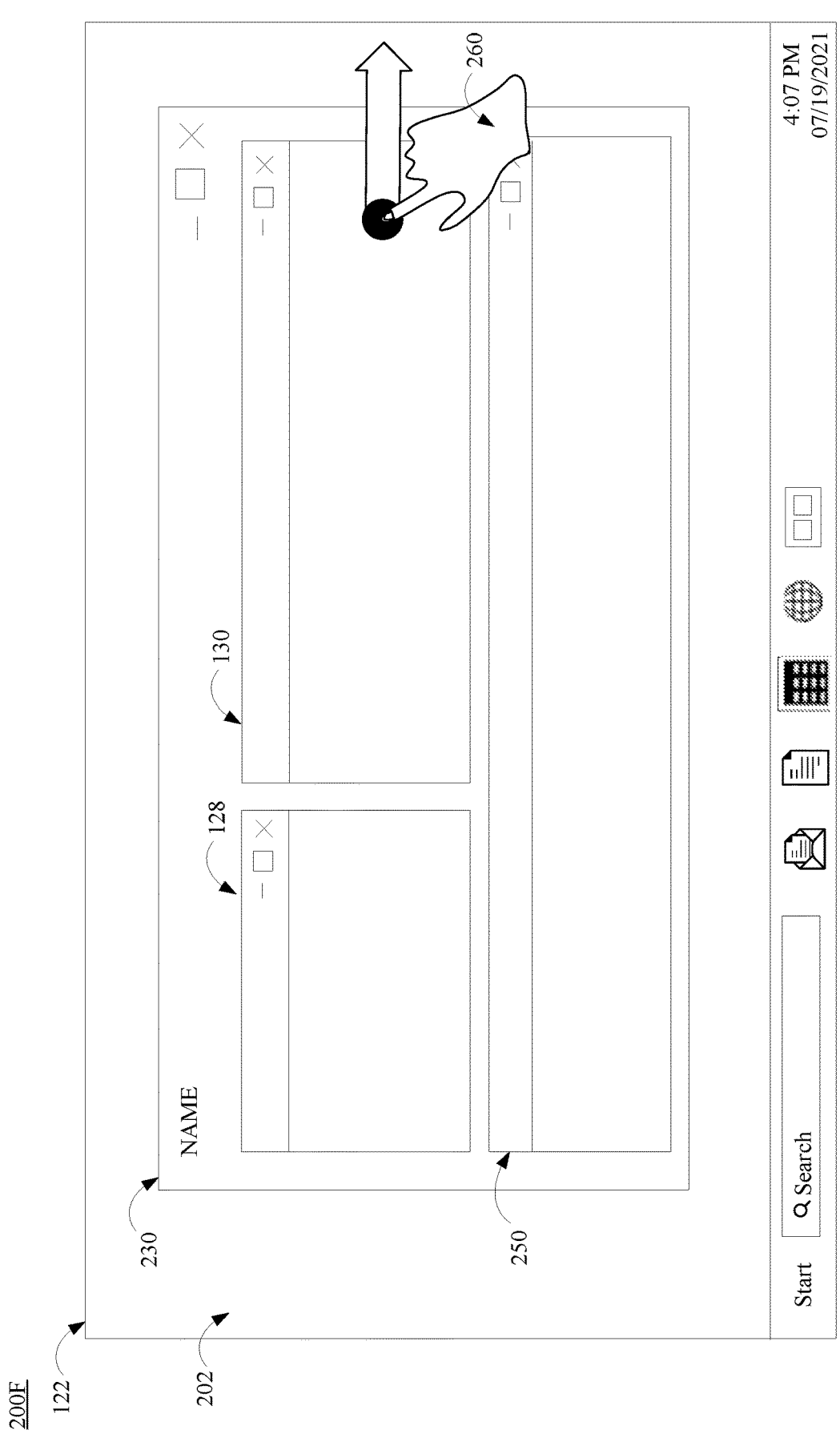
FIG. 2F depicts an example release of an existing window from the container.

FIG. 2F is a user interface diagram 200F depicting an example release of an existing window, such as the second window 130, from the container 230 depicted in FIG. 2E. Once the user has found and accessed the content items they need to aid them in drafting the document using the second application 118 (e.g., the document management and collaboration application), the user may no longer need to interact with the second application 118 via the second window 130 and may want to ungroup the second window 130 from the first window 128 (e.g., release the second window 130 from the container 230).

In response to receiving a request to ungroup the second window 130 from the first window 128, the second window 130 may be released from the container 230. In some examples, and as illustrated, the request to ungroup may be in a form of a user selection and movement 260 of the window to be ungrouped or released (e.g., a drag of the second window 130) outside of the container 230. This form of request may be referred to as an ungrouping gesture, particularly when the user utilizes touch or swipe input to perform the gesture. In other examples, closing of a window individually (e.g., using the functionalities of the window itself such as a close button of the window) within the container 230 may cause the closed window to be released from the container 230. In further examples, voice commands may be received via a voice interface supported by the operating system 120 and interpreted to execute the ungrouping of a window from the container 230. As one illustrative example, the user may provide a voice command that identifies a specific application, content item, or window title/name associated with the window to be released from the container 230.

Figure 2G:
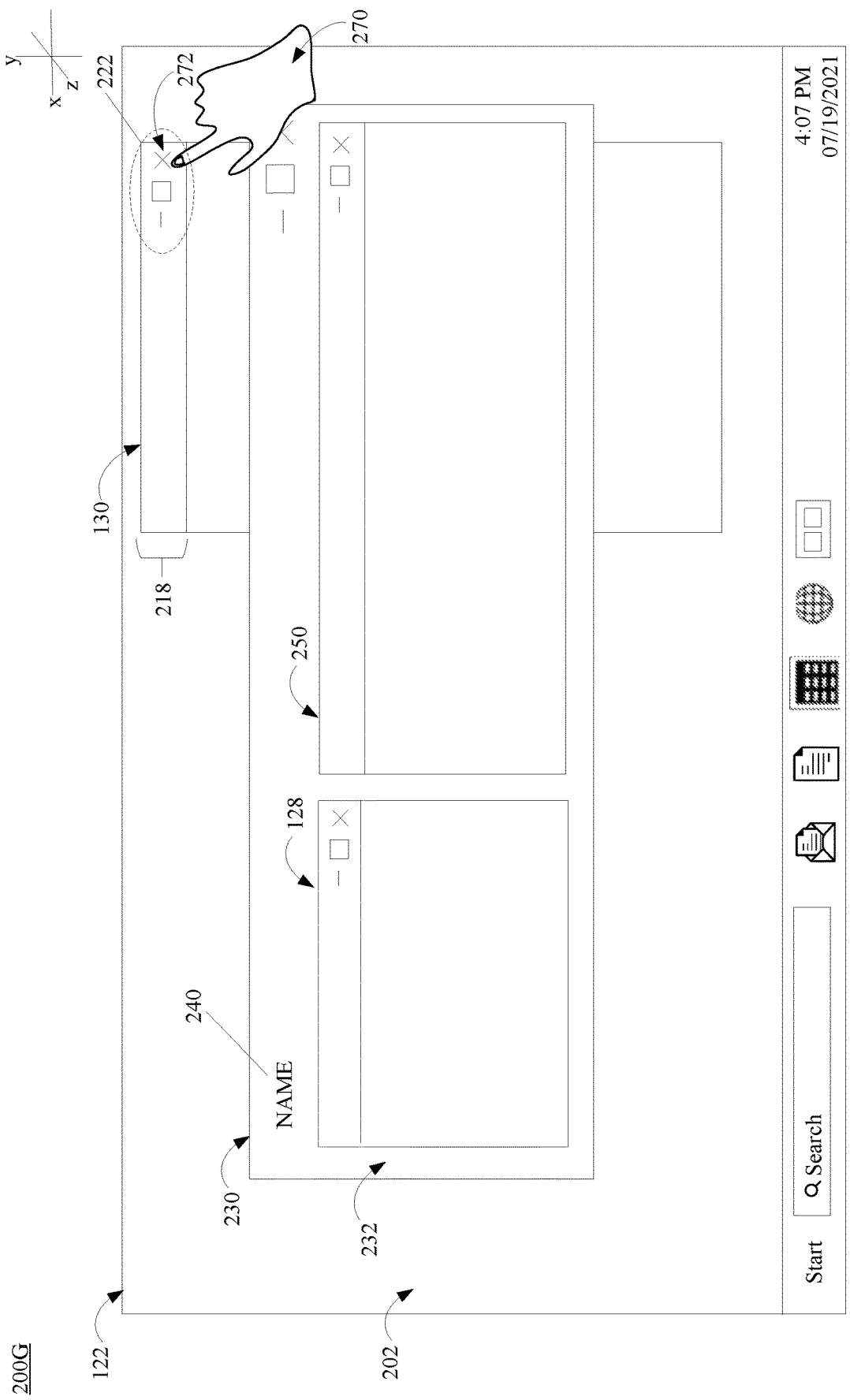
FIG. 2G depicts an example automatic window arrangement within the container subsequent to the release of the existing window from the container in FIG. 2F.

FIG. 2G is a user interface diagram 200G that depicts an example automatic window arrangement within the container 230 subsequent to the release of an existing window, such as the second window 130 released from the container in FIG. 2D. For example, in response to the release of the second window 130 from the container 230, the container 230, the first window 128, and/or the third window 250 may be automatically arranged based on the set of rules (including the hierarchies) associated with window arrangement within the container 230 described in detail with reference to FIG. 2C. In one example, container 230 may be a predefined size adjustable by the user, where the first and third windows 128, 250 may be arranged (e.g., based on size and/or position) within the workspace 232 of the container 230 to fit within the predefined size of the container 230. For example, the existing first and third windows 128, 250 may be automatically resized and/or repositioned based on the rules. In another example, the size of the container 230 may be automatically adjustable to fit each of the first and third windows 128, 250.

In some examples, once the second window 130 is released and the automatic arrangement has been performed within the container 230, a current state of the container 230 that identifies the first and third windows 128, 250 and their arrangement within the container 230, among other properties of the container, may be stored or updated locally on the client computing device 102.

In some examples, the name 240 of the container 230 may also be automatically updated upon the release of the second window 130. For example, the name 240 may be updated based on content items or applications associated with the remaining windows, particularly if a previous name was based on at least a portion of the content items or applications associated with the released window. In other examples, if the user had already entered or changed a previous name 240, the automatic updates to the name upon removal of existing windows may be disabled. Also, upon the release of the second window 130, the user may be enabled to manually change the previous name 240 or change the automatically updated name 240 of the container 230. Any manual or automatic updates to the name 240 may be stored as a property of the current state of the container 230.

Additionally, in some examples, once the second window 130 is released, the second window 130 may remain open and displayed within the work area 202 on the user interface 122. As illustrated, the container 230 may maintain a forward position in the z-order along the z-axis of the user interface 122 such that the container 230 appears on top of any other windows displayed on the user interface 122 that at least partially overlap with the container 230, such as the removed second window 130. For example, at least a portion of the second window 130 overlaps the container 230 on the user interface 122, causing that overlapping portion of the second window 130 to be hidden.

Further, now that the second window 130 is removed from the container 230, group functions performed in association with the container 230 may only affect the first window 128 and the third window 250. Instead, the user may utilize individual functions of the second window 130 to manipulate the second window 130. For example, and as illustrated, the user may close the second window 130 by selecting 270, from the buttons 222 in the title bar 218, a close button 272. Selection of the close button 272 may cause the second window 130 to be removed from display on the user interface 122 and cause the operating system 120 to stop executing the second application 118 associated with the second window 130.

FIGS. 3A to 8B include example user interface configurations illustrating various group functions performed in association with the container 230 having a current state as described with respect to FIG. 2G. For example, the container 230 may include the first window 128 and the third window 250 within the workspace 232 of the container 230.

Figure 3A:
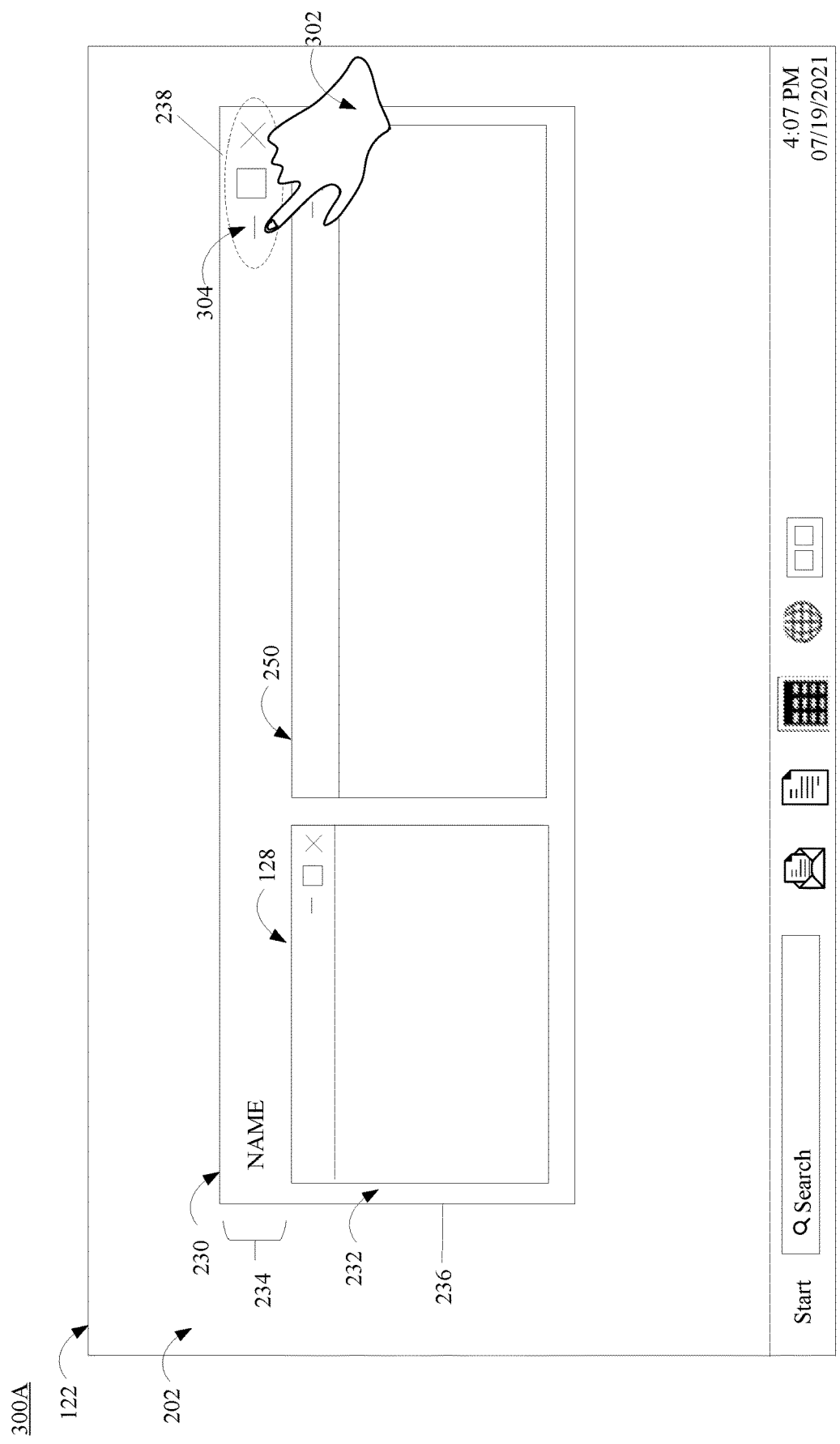
FIG. 3A depicts one example input type to request minimization of a container.
Figure 3B:
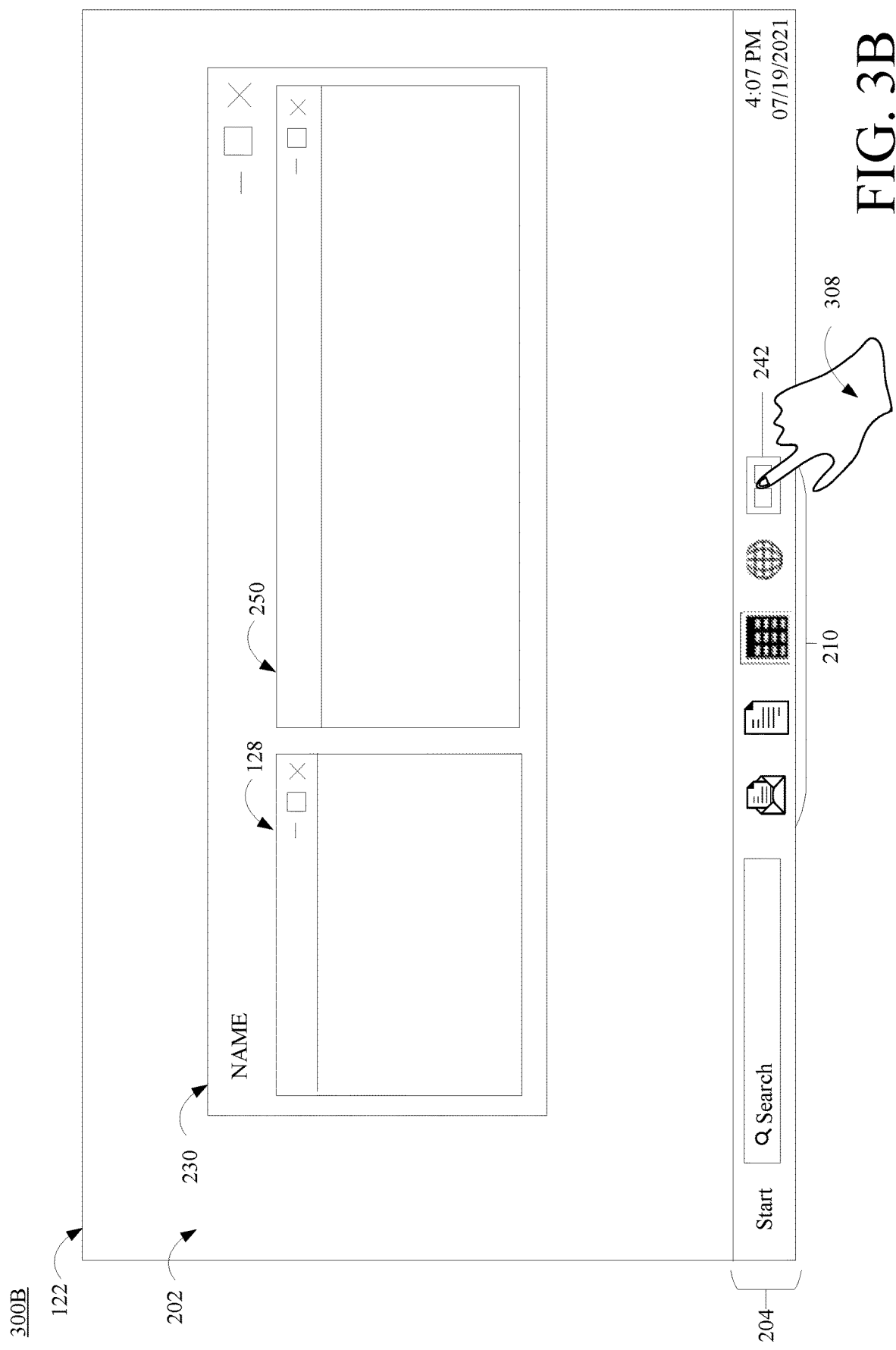
FIG. 3B depicts another example input type to request minimization of a container.

FIGS. 3A to 3C depict example user interface configurations illustrating performance of a group minimize function in association with the container 230. FIG. 3A is a user interface diagram 300A that depicts one example input type to request minimization of the container 230. For example, a user may select 302 a minimize button 304 from the buttons 238 of the title bar 234 to cause the container 230 to be minimized, as shown in FIG. 3C. FIG. 3B is a user interface diagram 300B that depicts another example input type to request minimization of the container 230. For example, a user may select 308 the grouping icon 242 that is displayed among the icons 210 on the task bar 204 of the user interface 122. When the container 230 is open and displayed within the work area 202 on the user interface 122 as illustrated, selection of the grouping icon 242 may cause the container 230 to be minimized, as shown in FIG. 3C. In another example (not illustrated herein), a user selection of the grouping icon 242 may cause a menu of options to be displayed, where the options may include to minimize the container 230, among other similar group functions. The input types described in FIGS. 3A and 3B are non-limiting, non-exhaustive input types for requesting minimization of the container 230.

FIG. 3C is a user interface diagram 300C that depicts minimization of the container 230 in response to an input type requesting minimization of the container 230, such as one of the input types illustrated and described with reference to FIGS. 3A and 3B. As illustrated, minimization of the container 230 causes the container 230 to be hidden from display within the work area 202 of the user interface 122. Because the minimization function was performed in association with the container 230 (e.g., was a group minimize function), the first window 128 and the third window 250 grouped within the container 230 may function and behave uniformly as a single window such that the first window 128 and the third window 250 are hidden in conjunction with the container 230. In some examples, to indicate that the container 230 and the first and third windows 128, 250 therein remain open but are currently hidden from display, a graphical scheme 310, such as shading, highlighting, underlining, etc., may be applied to the grouping icon 242 that is displayed among the icons 210 on the task bar 204 of the user interface 122.

Figure 4A:
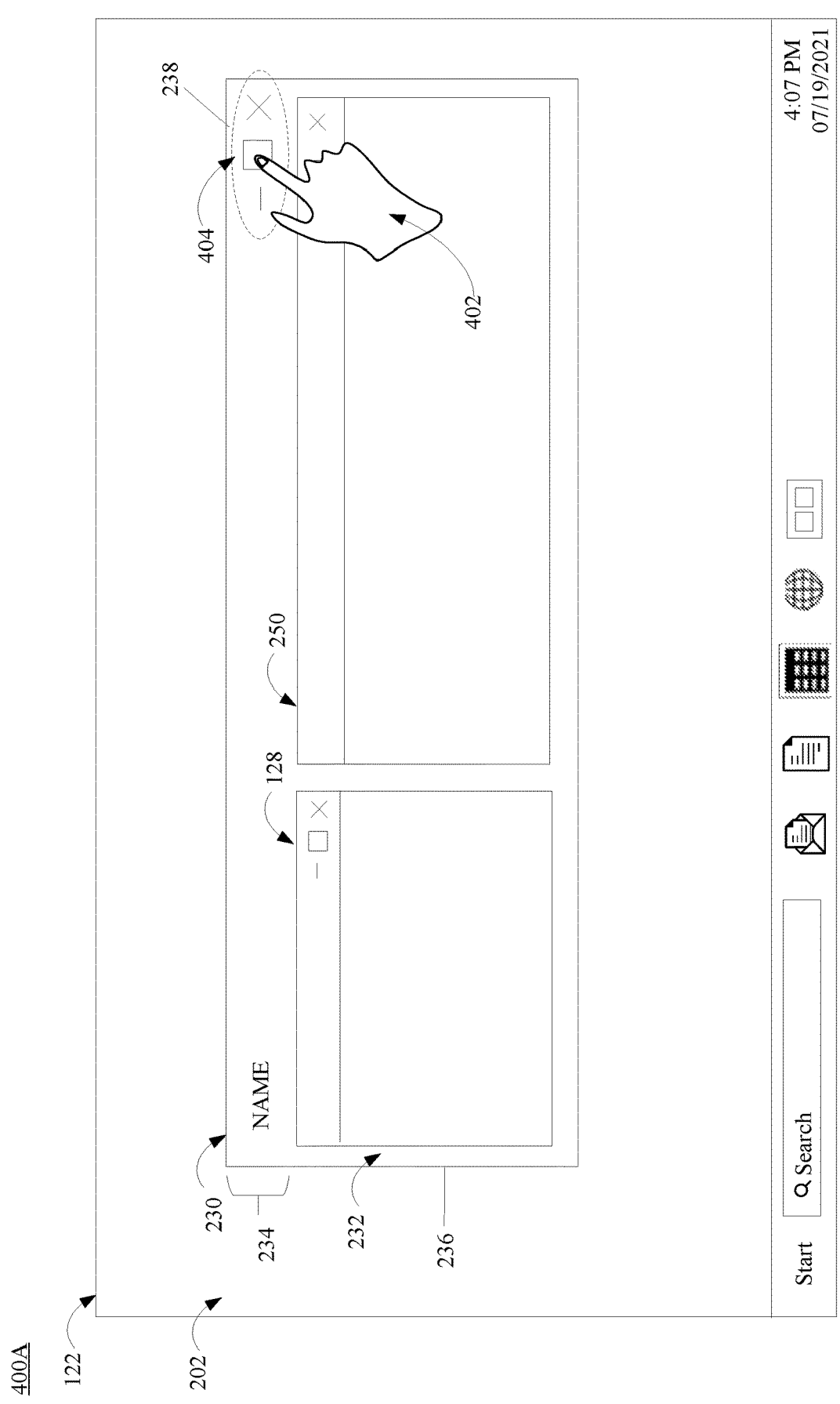
FIG. 4A depicts one example input type to request maximization of a container.
Figure 4B:
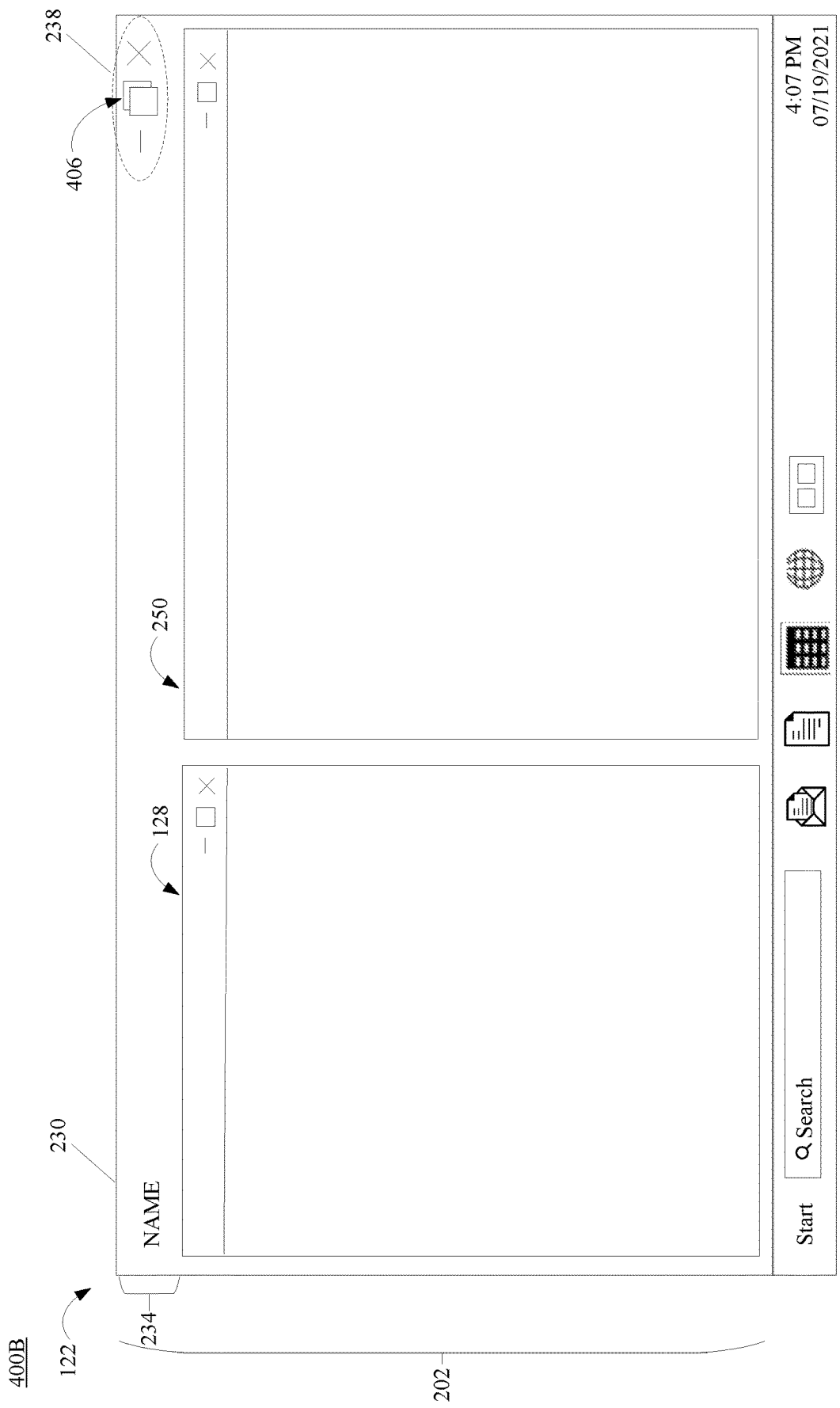
FIG. 4B depicts maximization of the container in FIG. 4A.

FIGS. 4A to 4B depict example user interface configurations illustrating performance of a group maximize function associated with the container 230. FIG. 4A is a user interface diagram 400A that depicts one example input type to request maximization of the container 230. For example, a user may select 402 a maximize button 404 from the buttons 238 displayed on the title bar 234 to cause the container 230 to be maximized, as shown in FIG. 4B.

FIG. 4B is a user interface diagram 400B that depicts maximization of the container 230 in response to an input type requesting maximization of the container 230, such as the non-limiting example input type described with reference to FIG. 4A. Maximization of the container 230 causes the container 230 to be enlarged such that the container 230 occupies an entirety of the work area 202 on the user interface 122. Because the maximization function was performed in association with the container 230 (e.g., was a group maximize function), the first window 128 and the third window 250 grouped within the container 230 may function and behave uniformly as a single window such that the first window 128 and the third window 250 are enlarged within the workspace 232 of the container 230. The first window 128 and the third window 250 may be enlarged proportionally to the container 230. For example, if prior to maximization of the container 130, the first window 128 occupies 25% of the container 230 and the third window 250 occupies 75% of the container 230, the same window occupation percentages for each of the first window 230 and the third window 250 apply when the container 230 is maximized (or is in any other non-maximized size). In some examples, when the container 230 is maximized, the maximize button 404 described and illustrated in FIG. 4A may be replaced with the restore button 406 among the buttons 238 of the title bar 234 of the container 230. The restore button 406 may be a selectable button that causes the container 230 to be restored to its previous size and position within the work area 202 on the user interface 122 prior to the maximization of the container 230.

Figure 5A:
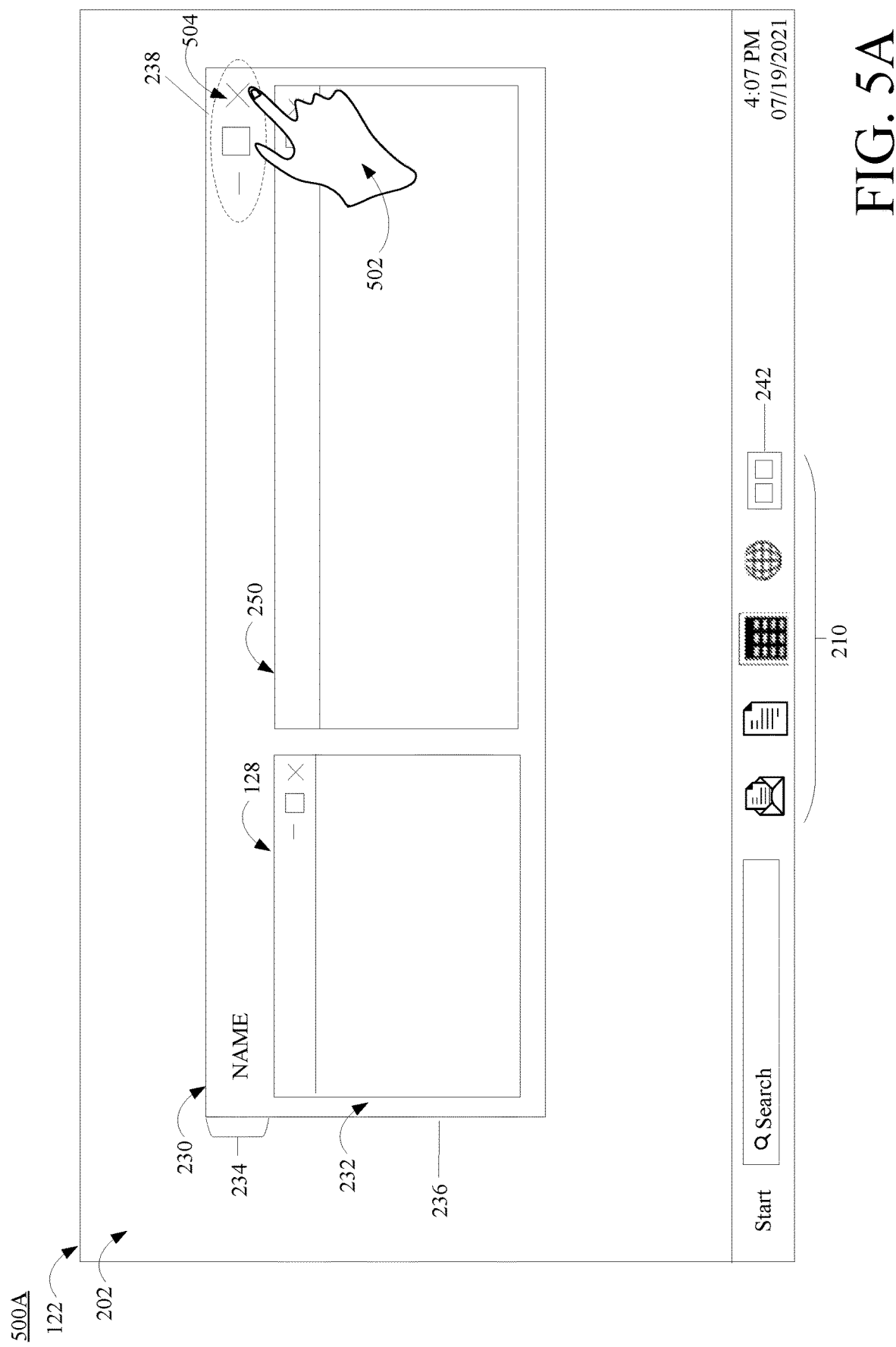
FIG. 5A depicts one example input type to request closing of a container.

FIGS. 5A to 5B depict example user interface configurations illustrating performance of a group close function associated with the container 230. FIG. 5A is a user interface diagram 500A that depicts one example input type to request closing of the container 230. For example, a user may select 502 a close button 504 from the buttons 238 displayed on the title bar 234 of the container 230 to cause the container 230 to close, as shown in FIG. 5B.

FIG. 5B is a user interface diagram 500B that depicts a closing of the container 230 in response to an input type requesting to close the container 230, such as the non-limiting example input type described with reference to FIG. 5A. Closing of the container 230 causes the container 230 to be entirely removed from display within the work area 202 of the user interface 122 and any programs or applications associated therewith to stop being executed or be deactivated by the operating system 120. For example, because the closing function was performed in association with the container 230 (e.g., was a group close function), the first window 128 and the third window 250 grouped within the container 230 may function and behave uniformly as a single window such that the first window 128 and the third window 250 are removed from display and the applications associated therewith are no longer executed by the operating system 120. The grouping icon 242, which was previously present in FIG. 5A, may also be removed from the icons 210 displayed among the task bar 204 to indicate that the container 230 is no longer open.

Figure 6B:
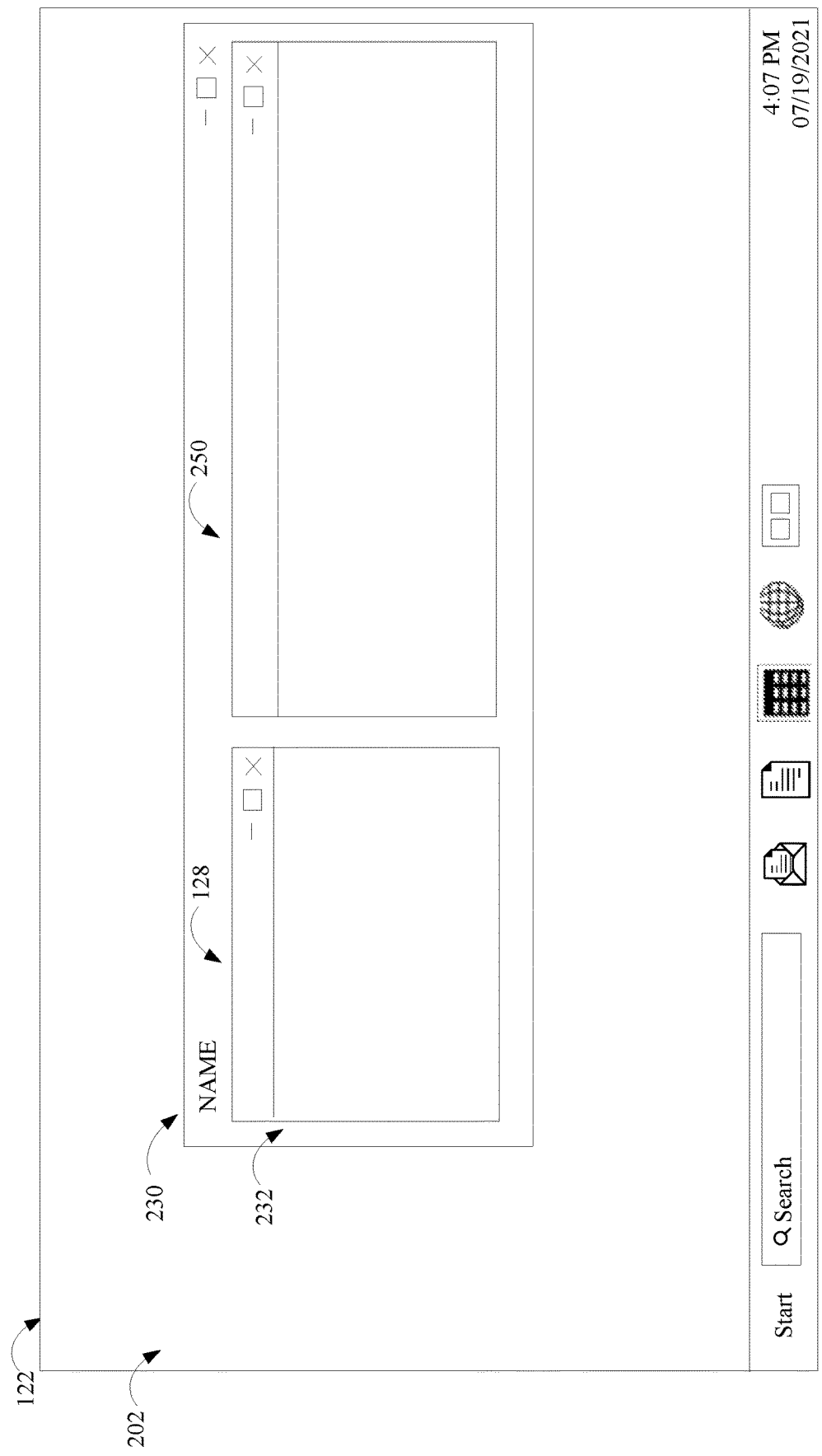
FIG. 6B depicts the resized container of FIG. 6A.

FIGS. 6A to 6B depict example user interface configurations illustrating performance of a group resize function associated with the container 230. FIG. 6A is a user interface diagram 600A that depicts one example input type 602 to resize the container 230. For example, the input type 602 may include the user selecting along a side or a corner of the border 236 of the container 230 to resize the container 230 by moving or dragging the container 230 in a particular direction to cause the container 230 to be resized. In this particular example, the user may be selecting a bottom, right corner of the border 236 of the container 230 and moving the selected corner outward from the container 230 to cause the container 230 to be resized simultaneously and proportionally in both a vertical and horizontal direction. The outward motion may be vertically downward and horizontally to the right. Therefore, in the vertical direction, the container 230 may be extended downward along the y-axis, and in the horizontal direction, the container 230 may be extended to the right along the x-axis, as shown in FIG. 6B.

User selections of other parts of the border 236 (e.g., along the sides or of different corners) of the container 230, may cause the container 230 to be resized in a different manner in accordance with a particular direction that the selected part of the border 236 is moved.

FIG. 6B is a user interface diagram 600B depicting a container 230 that has been resized in response to an input type to resize the container 230, such as the non-limiting example input type described with reference to FIG. 6A. Because the resizing function was performed in association with the container 230 (e.g., was a group resize function), the first window 128 and the third window 250 grouped within the container 230 may function and behave uniformly as a single window such that the first window 128 and the third window 250 are resized within the workspace 232 of the container 230 simultaneously and proportionally in both a vertical and horizontal direction with respect to each other and the container 230. For example, if prior to the resizing of the container 130, the first window 128 occupies 25% of the container 230 and the third window 250 occupies 75% of the container 230, the same window occupation percentages for each of the first window 230 and the third window 250 apply when the container 230 is resized.

Figure 7A:
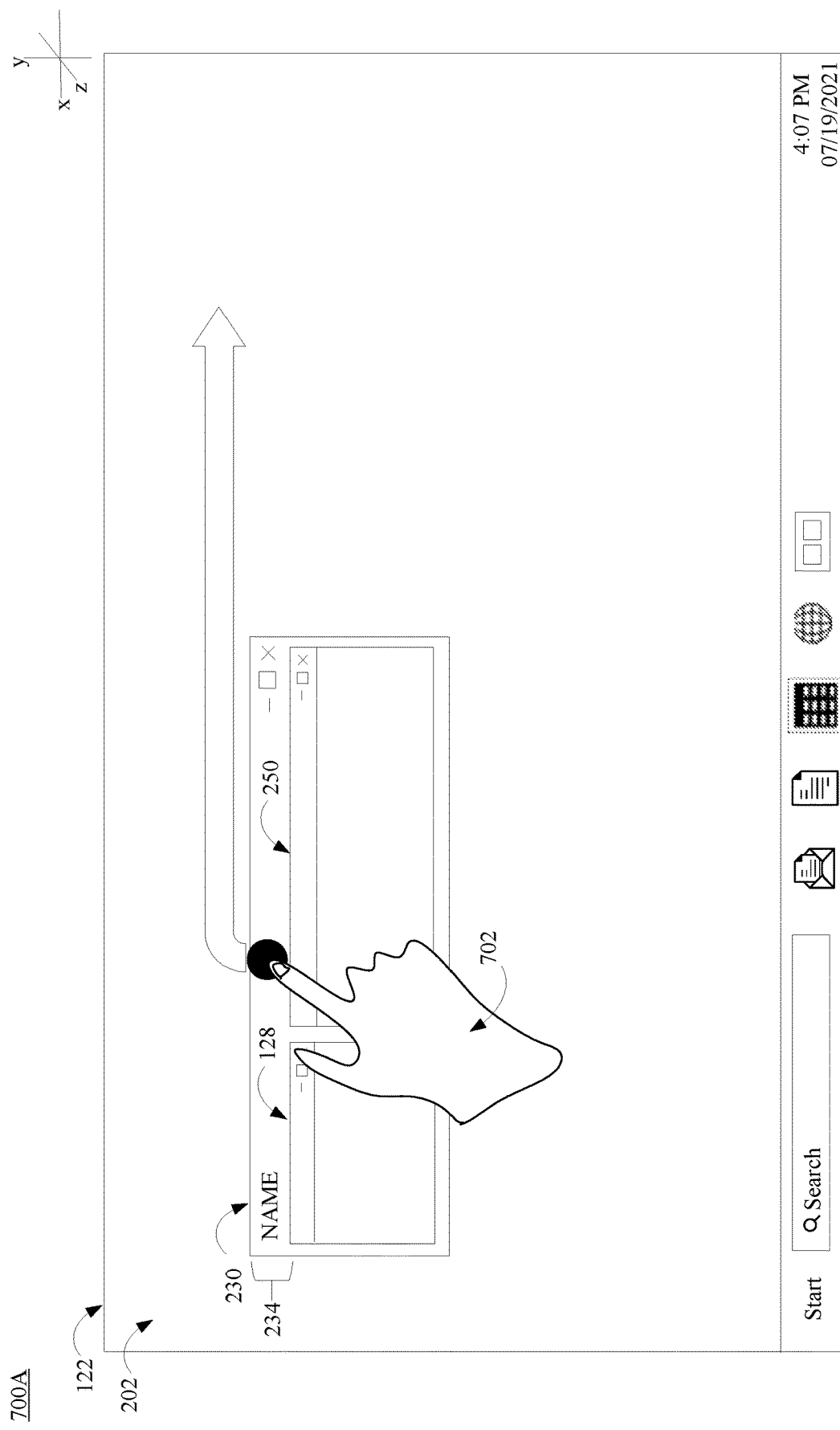
FIG. 7A depicts one example input type to reposition a container.

FIGS. 7A to 7B depict example user interface configurations illustrating performance of a group reposition function associated with the container 230. FIG. 7A is a user interface diagram 700A that depicts one example input type 702 to reposition the container 230. For example, the input type 702 may include the user selecting a portion of the title bar 234 of the container 230 and moving or dragging the container 230 in a particular direction to move the container 230 from a current, first position to a second position on the user interface 122, as shown in FIG. 7B. In this particular example, upon selecting the portion of the title bar 234 of the container 230, the user may move the container 230 vertically upward and horizontally to the right across the work area 202 of the user interface 122. Therefore, in comparison to the first position, the second position of the container 230 subsequent to the move may be vertically upward along the y-axis and horizontally to the right along the x-axis on the user interface 122. In this example, the container 230 is moved across the user interface 122 for display within a same screen (e.g., the screen 124 of the client computing device 102). In other examples, the container 230 may be similarly moved across the user interface 122 for display on another display device, such as the monitor 126 communicatively coupled to the client computing device 102, or across virtual desktops.

FIG. 7B is a user interface diagram 700B depicting the container 230 that has been repositioned in response to an input type to reposition the container 230, such as the non-limiting example input type 702 described with reference to FIG. 7A. Because the reposition function was performed in association with the container 230 (e.g., was a group reposition function), the first window 128 and the third window 250 grouped within the container 230 may function and behave uniformly as a single window such that the first window 128 and the third window 250 are moved as part of or along with the container 230. For example, the first window 128 and the third window 250 may remain a same size and within a same position in the workspace 232 of the container 230 as the container is moved.

Figure 8A:
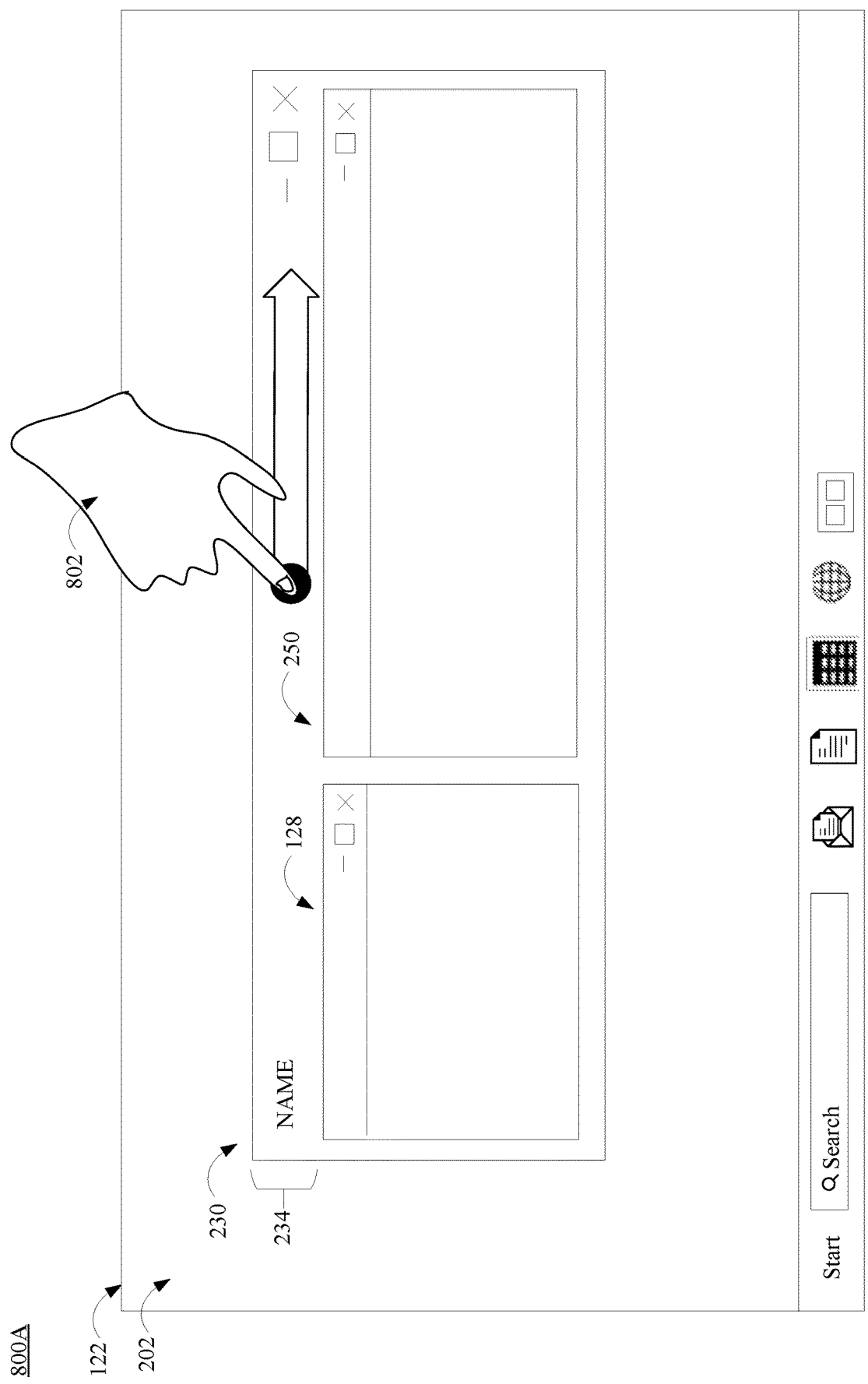
FIG. 8A depicts one example input type to snap a container.
Figure 8B:
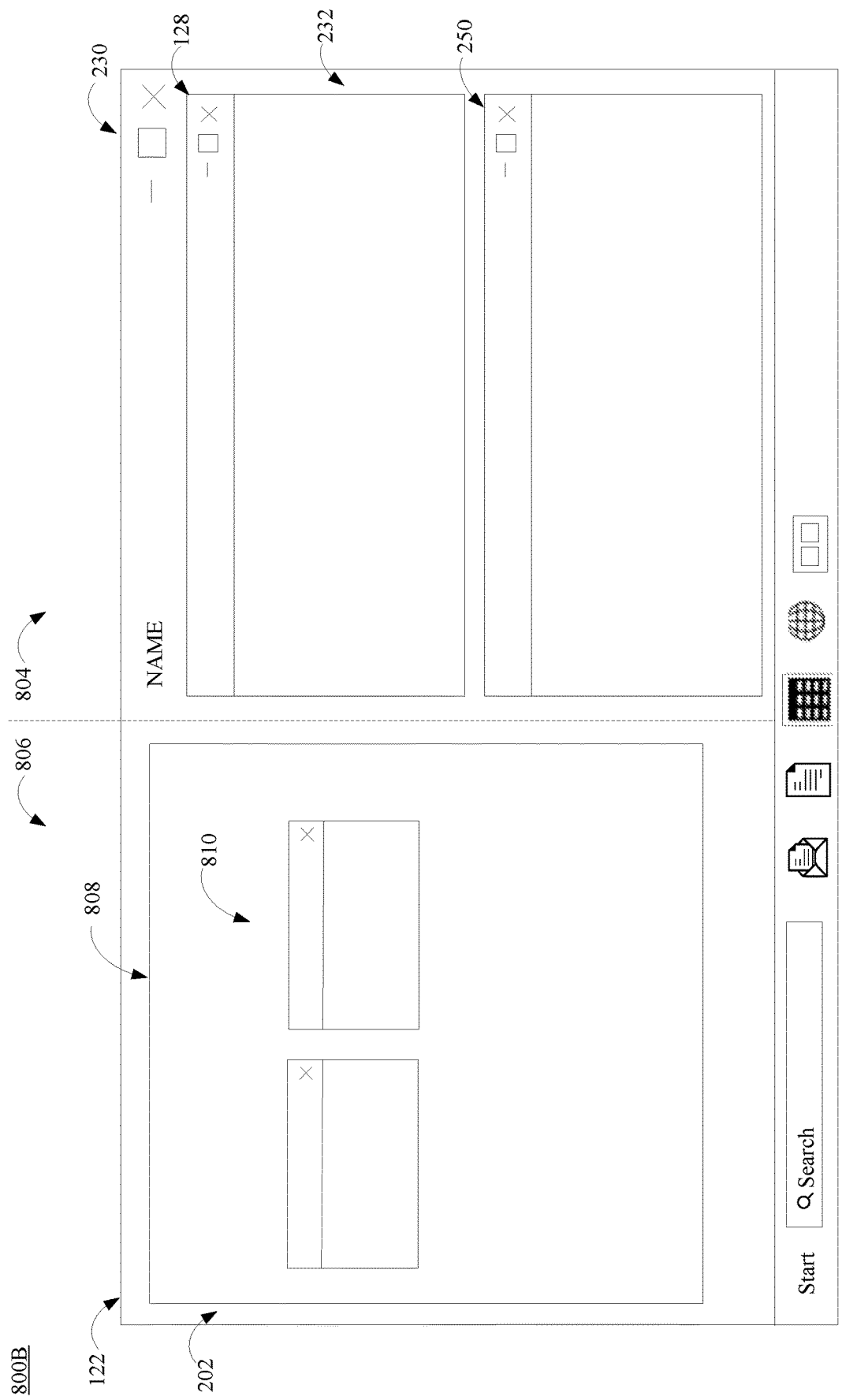
FIG. 8B depicts the snapped container of FIG. 8A.

FIGS. 8A to 8B depict example user interface configurations illustrating performance of a group snap function associated with the container 230. FIG. 8A is a user interface diagram 800A that depicts one example input type 802 to snap the container 230. For example, the input type 802 may include the user selecting a portion of the title bar 234 of the container 230 and moving or dragging the container 230 in a horizontal direction toward either a right or left edge of the user interface 122 displayed on the screen 124 of the client computing device 102, for example. As the container 230 approaches the edge, the user may provide, for example, a swipe input to indicate a request to snap the container 230. In this particular example, upon selecting the portion of the title bar 234 of the container 230, the user may move the container 230 horizontally to the right across the work area 202 of the user interface 122 toward the right edge of the user interface 122.

FIG. 8B is a user interface diagram 800B depicting the container 230 that has been snapped to the right edge of the user interface 122 in response to receiving a request to snap the container 230, such as the non-limiting example input type 802 described with reference to FIG. 8A. Because the snap function was performed in association with the container 230 (e.g., was a group snap function), the first window 128 and the third window 250 grouped within the container 230 may function and behave uniformly as a single window such that the first window 128 and the third window 250 are snapped as part of or along with the container 230. As illustrated, snapping of the container 230 to the right edge of the user interface 122 may cause the work area 202 of the user interface 122 to separate into two portions (emphasized by dashed lines).

A first portion 804 on the right side of the work area 202 may include the container 230, which has been resized to occupy an entirety of the first portion 804. Accordingly, the first window 128 and the third window 250 may be rearranged within the workspace 232 of the resized container 230 based on the set of rules (including the hierarchies) described in detail with references to FIG. 2C. For example, one or both of the first and third windows 128, 250 may be resized, repositioned, or resized and repositioned to fit within the workspace 232 of the resized container 230.

A second portion 806 on the left side of the work area 202 may include a display panel 808. In some examples, the display panel 808 may occupy an entirety of the second portion 806 such that any other objects present on the left side of the work area 202 are covered by the display panel 808. The display panel 808 may include one or more additional windows 810 that may be open (e.g., including those that are open but hidden or minimized) on the user interface 122. User selection of one of these additional windows within the display panel 808 may cause the selected window to be displayed within the second portion 806. The selected window may occupy an entirety of the second portion 806.

FIGS. 3A to 8B described above included example user interface configurations illustrating various group functions performed in association with the container 230 displayed within the work area 202 on the user interface 122. While touch or swipe-based input types or interactions were primarily described, other input types associated with other input devices, such as those described with reference to FIG. 14, may similarly trigger the various requests (e.g., the requests to minimize, maximize, close, resize, reposition, and snap). As one illustrative example, for operating systems supporting voice interfaces, voice commands requesting to perform the various group functions in association with the container 230 may be received and interpreted to perform the requests. In addition to being able to perform group functions in association with the container 230 that cause the first window 128 and second window 130 to behave uniformly as a single window, the first window 128 and third window 250 may maintain individual functions to enable a user to interact with just one of the windows individually. As one non-limiting example, FIG. 9A-9B depict example user interface configurations illustrating an individual resizing of a window, such as the first window 128, within the container 230.

Figure 9A:
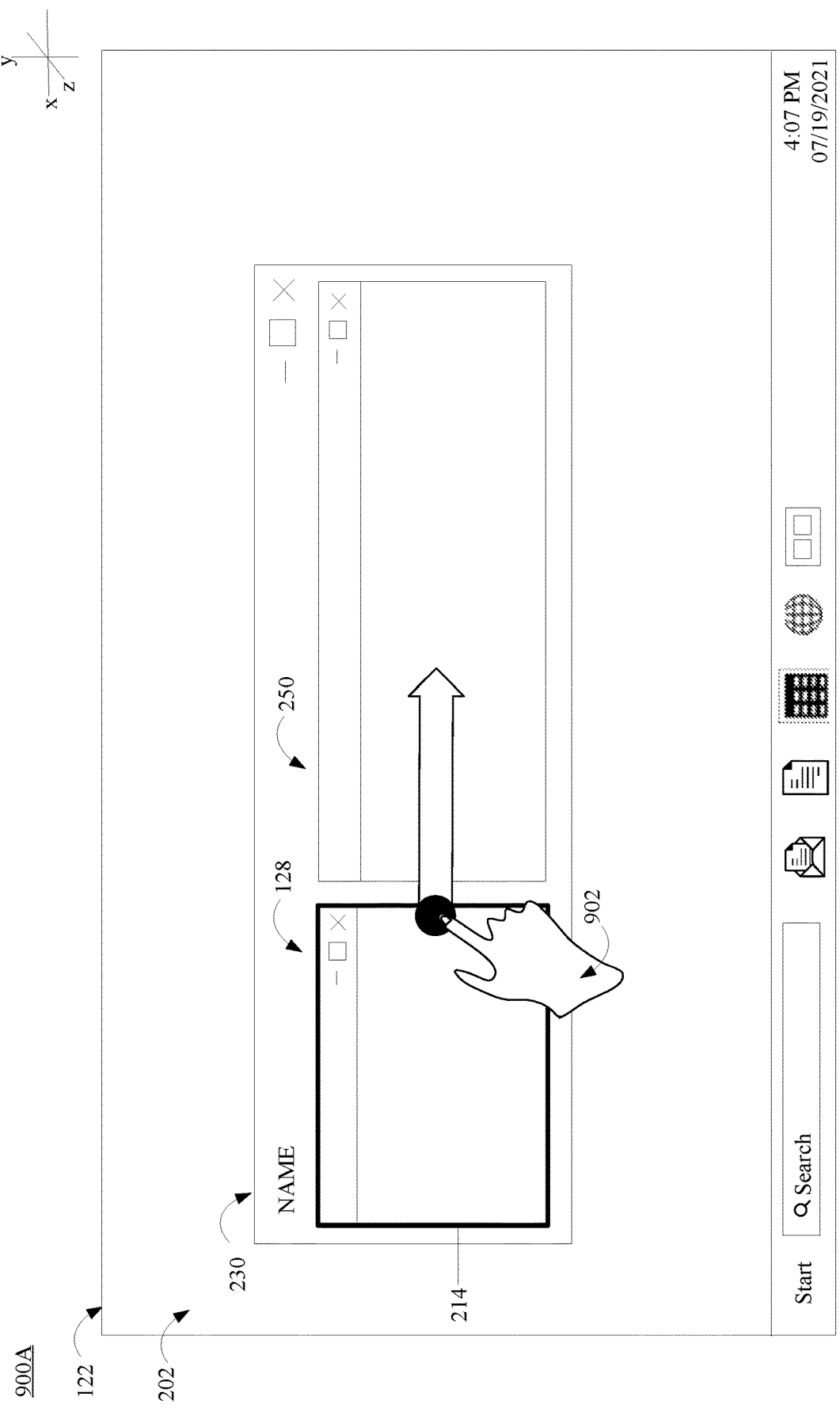
FIG. 9A depicts an example input type to resize a window individually within a container.

FIG. 9A is a user interface diagram 900A that depicts one example input type 902 to individually resize the first window 128 in the container 230. For example, the input type 902 may include the user selecting along a side or a corner of the border 214 of the first window 128 to resize the first window 128 by moving or dragging the first window 128 in a particular direction to cause the first window 128 to be resized. In this particular example, the user may be selecting a portion along a right side of the border 214 of the first window 128 and moving the selected portion to the right to cause the first window 128 to be resized in the horizontal direction. Therefore, in the horizontal direction, a length of the first window 128 may be extended to the right along the x-axis, as shown in FIG. 9B.

User selections of other parts of the border 214 (e.g., along other sides or of corners) of the first window 128, may cause the first window 128 to be resized in a different manner in accordance with a particular direction that the selected part of the border 214 is moved.

Figure 9B:
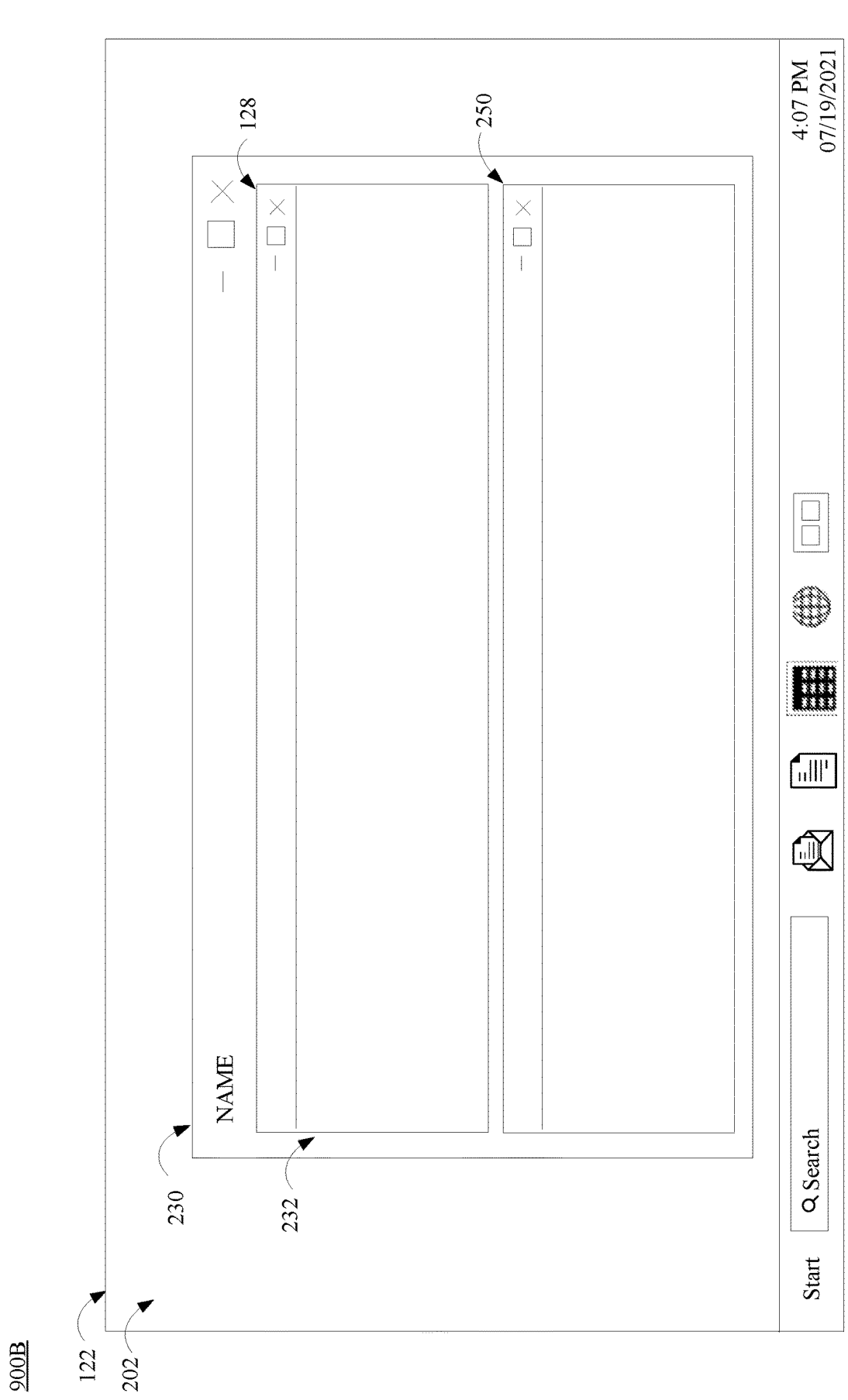
FIG. 9B depicts the container of FIG. 9A subsequent to the individual resizing of the window.

FIG. 9B is a user interface diagram 900B depicting the container 230 that includes the first window 128 having been individually resized in response to an input type to individually resize the first window 128, such as the non-limiting example input type 902 described with reference to FIG. 9A. In some examples, based on the size and/or position of the first window 128 after being resized within the workspace 232 of the container 230, the container 230 and/or other windows within the workspace 232, such as the third window 250, may be automatically updated or changed based on the set of rules (including hierarchies) for arranging grouped windows within the container 230. For example, as illustrated in FIG. 9B, the container 230 may be resized to be larger in both the vertical and horizontal directions (e.g., extended along the x and y-axes), and the third window 250 may be resized and repositioned beneath the first window 128 within the workspace 232 of the container 230.

FIGS. 9A-9B represent one non-limiting example of performance of individual functions to a window within a container. In other examples, a window may be individually repositioned, minimized, maximized, restored to the container if previously maximized, and closed.

FIGS. 10A-11B depict example user interfaces illustrating example methods for invoking a stored container. As previously discussed, one or more states of a container may be stored and accessible for later selection by a user such that the user may quickly and easily return to the container at a later time with minimal input, rather than having to individually re-open all associated windows, improving user efficiency and interactivity with the client computing device 102. In some examples, any time a number of windows and/or an arrangement of the container or windows within the container changes or is updated, a current state of the container may be stored. In other examples, the state may be stored in response to a closing of the container such that a current state of the container just prior to closing may be later retrievable and provided for display on the user interface 122.

In some scenarios, a user may manually close the container, as illustrated for the container 230 with respect to FIGS. 5A and 5B. In other scenarios, the operating system may be rebooted, which may cause the container to be automatically closed. For example, the client computing device may be restarted (manually or automatically) or powered off and back on. After the container has been closed, and the user desires to return to the container, the container may be invoked using a variety of methods.

Figure 10B:
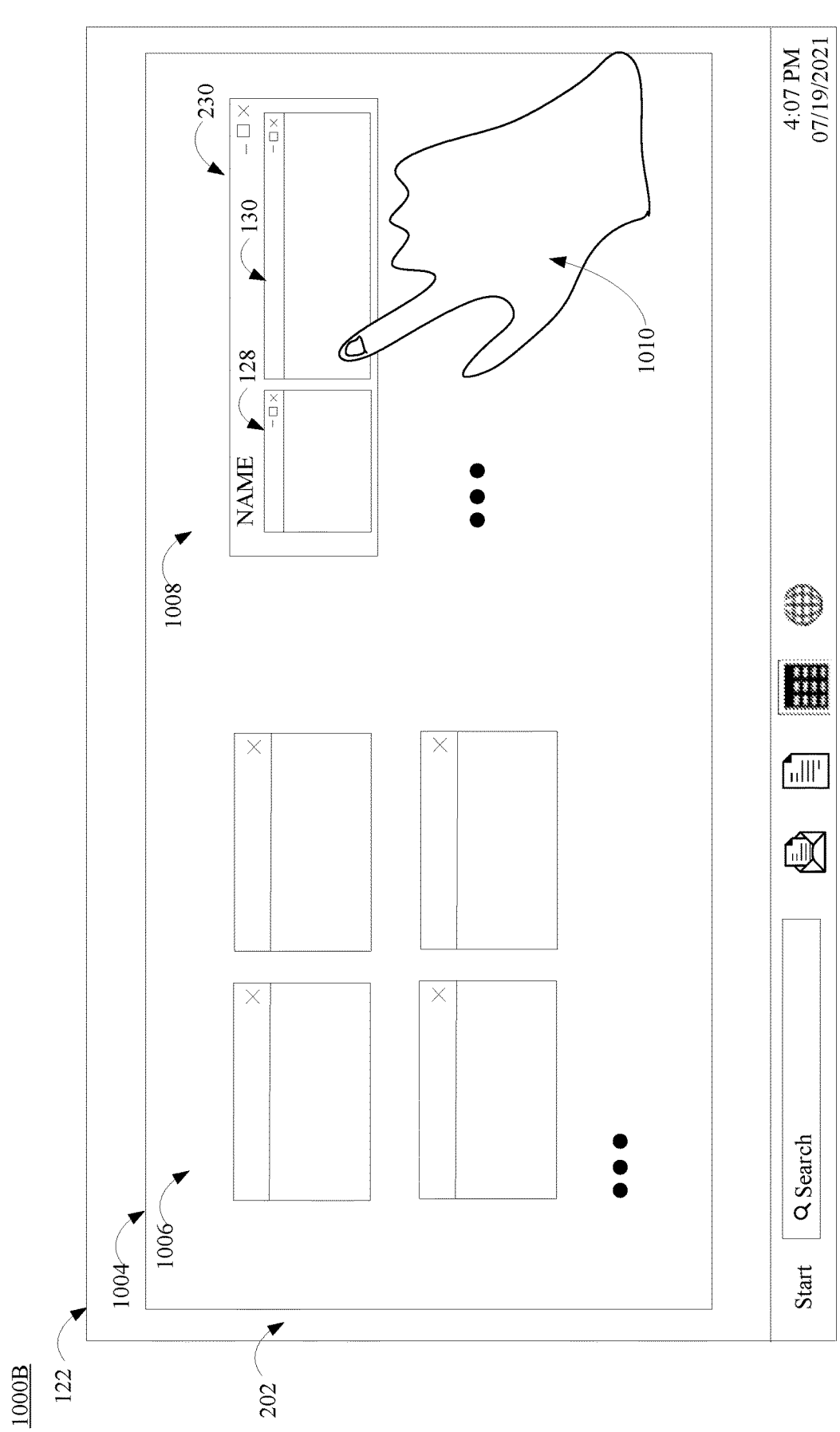
FIG. 10B depicts an example display panel including the stored container for selection.
Figure 10C:
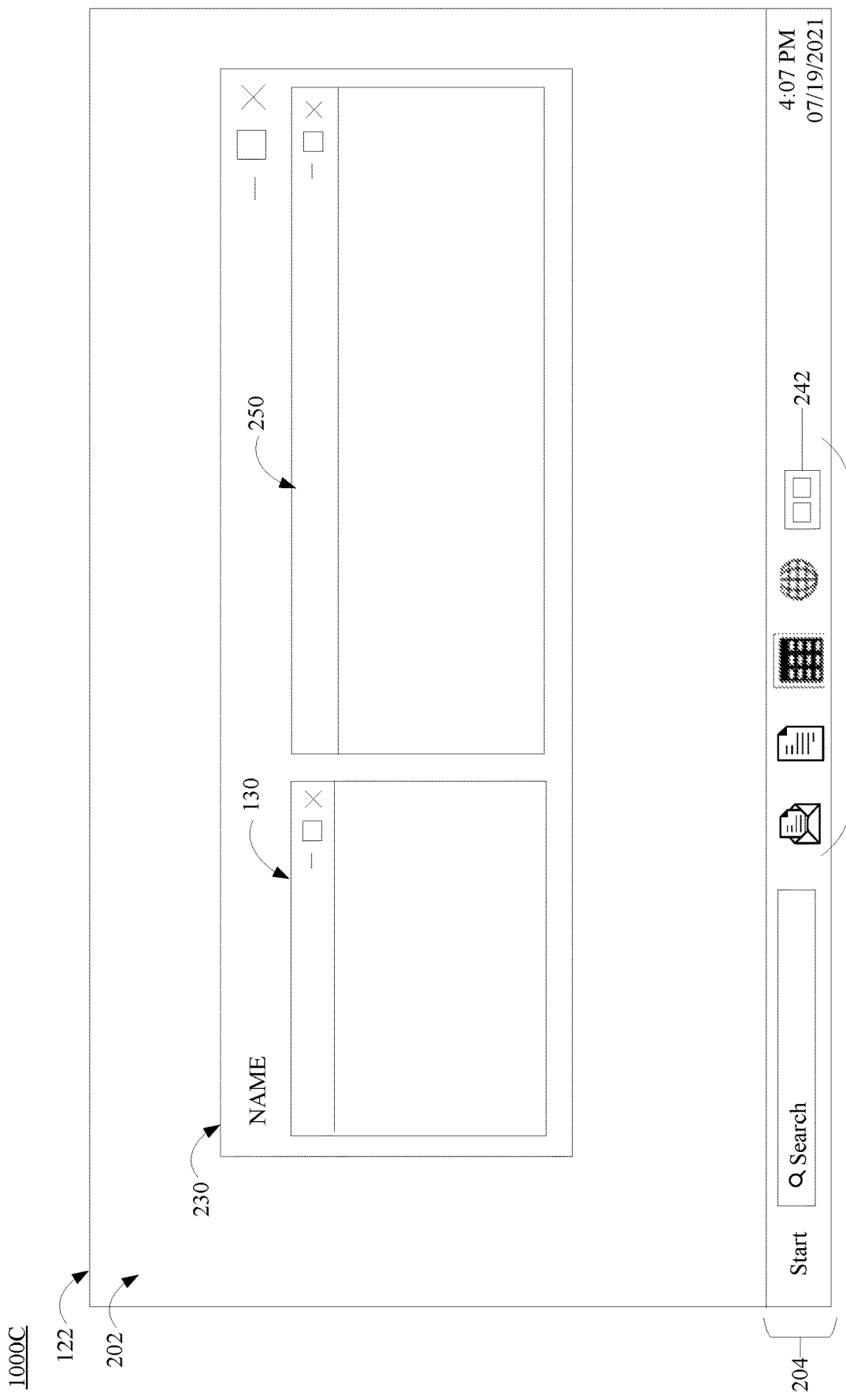
FIG. 10C depicts the invoked container.

FIGS. 10A-10C depict one example method for invoking a stored container. FIG. 10A is a user interface diagram 1000A that depicts one example input type 1002 to invoke a stored container, such as container 230. For example, the input type 1002 may include the user selecting a portion of the work area 202 of the user interface 122 that does not contain other objects near a right side of the user interface 122 and performing a swipe motion in a horizontal direction (e.g., along the x-axis) toward the left side of the user interface 122 to cause a display panel 1004 to be displayed as shown in FIG. 10B. This input type 1002 may also be referred to as a switch gesture, particularly when the user utilizes touch or swipe input to perform the gesture. In other examples, if the client computing device 102 includes a touchpad, the display panel 1004 may be performed in response to a user providing a particular type of swipe input (e.g., a multi-finger swipe) to the touchpad. In further examples, the request to invoke the stored container may include any action indicating to present a display panel listing one or more containers having stored states, such as the display panel 1004.

FIG. 10B is a user interface diagram 1000B depicting the display panel 1004 presented in the work area 202 of the user interface 122 in response to an input type to invoke a stored container, such as the non-limiting example input type 1002 described with reference to FIG. 10A. In some examples, the display panel 1004 may occupy an entirety of the work area 202 of the user interface 122. The display panel 1004 may include a plurality of portions, including at least a first portion 1006 and a second portion 1008. The first portion 1006 may display windows or containers, if any, that are currently open and executing on the client computing device 102. The second portion 1008 may include stored containers, including at least the stored container 230. The stored containers may be associated with a state. The state may identify a size of the container, a position of the container on the user interface 122, a name of the container, an application with which each window included in the container is associated, a content item with which one or more windows included in the container is associated, a size and a position of each window included in the container, and other stylistic and/or visual characteristics as defined by the set of rules, for example. In some examples, the stored containers as displayed within the second portion 1008 of the display panel 1004 may visually represent at least certain aspects of the associated states of the stored containers.

Referring back to the grouping and ungrouping sequences described with respect to FIGS. 2A to 2G, the container 230 displayed within the second portion 1008 of the display panel 1004 in FIG. 10B may be in a state of the container 230 as described with respect to FIG. 2G. This state may be a most current state (e.g., a state of the container 230 prior to a most recent closing of the container 230). In some examples, the second portion 1008 may include more than one state of the container 230 as it was changed and updated. For example, the second portion 1008 may include a state associated with the container as described with reference to FIG. 2A, a state associated with the container as described with reference to FIG. 2E, and the state associated with the container as described with reference to FIG. 2G. When multiple states for the same container are displayed, the states may be ordered chronologically, where the most recent state is displayed more prominently (e.g., forward of or above) the remaining states.

In response to a user selection 1010 of the container 230 displayed in the second portion 1008 of the display panel 1004, the container 230 may be re-opened and displayed on the user interface 122 in accordance with the associated state of the container 230, as shown in FIG. 10C. This allows the user to quickly resume progress on an ongoing project rather than having to spend time individually re-opening, re-sizing, and re-positioning windows on the user interface 122. For example, the container 230 may have a same name, size, and position on the user interface 122 in FIG. 10C as the container has in FIG. 2G. Similarly, the container 230 may include the same first and third windows 130, 250 and each of the first and third windows 130, 250 may be a same size and position within the workspace 232 of the container 230 in FIG. 10C as the container in FIG. 2G. The container 230 may further include the same visual and style characteristics.

Additionally, in some examples, once the container 230 is re-opened, the grouping icon 242 may be included as one of the icons 210 displayed on the task bar 204 of the user interface 122.

FIGS. 11A and 11B include user interface configurations illustrating another example method for invoking a stored container. For example, FIG. 11A is a user interface diagram 1100A depicting another example input type 1102 to invoke a stored container. The example input type 1102 may include the user selection of an icon 1104 associated with an application, such as the first application 116, from the task bar 204 of the user interface 122. In this example, the icon 1104 may be a pinned icon such that the icon 1104 remains on the task bar 204 even when the first application 116 is currently not being executed or is inactive on the client computing device 102 and no windows associated with the first application 116 are open and displayed on the user interface 122.

Upon user selection of the icon 1104, a determination may be made as to whether any locally stored containers include a window associated with the first application 116. In response to a determination that the first application 116 is not included in one of the locally stored containers, the first application 116 may be executed and a window associated with the first application 116 may be opened for display on the user interface 122. As shown in a user interface diagram 1100B of FIG. 11B, in response to a determination that the first application 116 is included in one of the locally stored containers, such as the container 230, the entirety of the container 230 (including the first window 128 and the third window 250) may be re-opened and displayed on the user interface 122 in accordance with the associated state of the container 230. Additionally, in some examples, once the container 230 is re-opened, the grouping icon 242 may be included as one of the icons 210 displayed on the task bar 204 of the user interface 122.

FIG. 12 depicts an example configuration 1200 of the user interface 122 illustrating a default container 1202 open for display within the work area 202 of the user interface 122.

The default container 1202 includes a title bar 1204 including buttons 1210, a workspace 1206, and a border 1208 that include the same features and functionalities as the title bar 234, buttons 238, workspace 232, and border 236 of container 230, respectively, as described in great detail with reference to FIG. 2C. For example, the same group functions performed in association with the container 230 may be performed in association with the default container 1202 to cause any windows included therein to behave or function as a single window in accordance with the group function.

However, in FIG. 2C, the container 230 may be generated in response to receiving example input types, such as those illustrated in FIG. 2A or 2B, indicative of a request to group at least two windows, such as the first window 128 and the second window 130. In contrast, in FIG. 12, the default container 1202 may be automatically populated with a plurality of windows 1212 associated with various application types and provided on the user interface 122 without user input. In some examples, the default container 1202 may include windows for each of the application types currently active or open the client computing device 102. The application types may be one of or a combination of multiple instances of a same application or different applications. In other examples, a portion of the application types may be selected for inclusion based on total usage or user preference (e.g., known based on settings or learned based on past activity). The user may then request to release one or more of the windows by performing an ungrouping gesture, for example, as shown and described in detail with reference to FIGS. 2F and 2G. In another example, one or more of the windows be automatically ejected based on non-use. As an illustrative example, initially all applications may be included within the default container 1202, and after a predefined period of time (e.g., 15 minutes, 30 minutes, an hour) of non-use of one or more applications, the applications may be ejected from the default container 1202.

Aspects of this disclosure are not limited to the non-exhaustive user interface configurations illustrated in FIGS. 2A to 12. The user interfaces and objects therein, including the container 230 or default container 1202, may be displayed using varying textual schemes, graphical schemes, audio schemes, animation schemes, coloring schemes, highlighting schemes, and/or shading schemes. Additionally, while touch or swipe-based input types or interactions were primarily described, other input types associated with other input devices, such as those described with reference to FIG. 14, may similarly trigger the various requests (e.g., the requests to group, ungroup, minimize, maximize, close, resize, reposition, and snap). As one illustrative example, for operating systems supporting voice interfaces, voice commands requesting to group and ungroup the windows, as well as perform the various group functions may be received and interpreted to perform the requests. Further, while a single container is described, in other aspects, a plurality of containers can be generated and interacted with concurrently on the user interface.

FIG. 13 illustrates an example windowing method 1300. The method 1300 may be provided by one or more components of the system 100 described in FIG. 1, such as the operating system 120 of the client computing device 102 having the user interface 122. The method 1300 begins at operation 1302 where at least two windows associated with one or more applications being executed by the operating system may be opened for display on the user interface of the operating system. For example, the two windows may include the first window 128 and the second window 130 as illustrated and described with reference to FIG. 1. In some examples, the first window 128 and the second window 130 may be associated with at least two different applications 114. For instance, the first window 128 may be associated with the first application 116 and the second window 130 may be associated with the second application 118. In other examples, the first window 128 and the second window 130 may be respectively associated with a first instance and a second instance of the same application 114. For example, the first window 128 and the second window 130 may be associated with first and second instances of the first application 116 or first and second instances of the second application 118.

At operation 1304, a request to group the two windows may be received via the user interface. Example input types indicative of the request to group the two windows are illustrated and described in detail with reference to FIGS. 2A and 2B. At operation 1306, a container may be generated that includes the two windows arranged based on one or more rules and a plurality of features enabling a plurality of group functions associated with the container to be performed.

As described in detail with reference to FIG. 2C, the container (e.g., container 230) may be a window including a title bar, a workspace, and a border surrounding the title bar and workspace area. The two windows may be arranged within the workspace, where the arrangement may include an automatic sizing and positioning of the two windows within the container based on the one or more rules. The rules for the automatic sizing and positioning may be based at least in part on a minimum window size associated with each respective application type. In other examples, the rules for the automatic sizing and positioning may also be based on predefined settings and/or window usage. The rules for the arrangement may further include hierarchies relating to at least size, alignment, and proximity associated with the container and objects, including each window, comprised therein. The title bar and border of the container may include the features enabling the group functions associated with the container to be performed. Example group functions may include minimizing, maximizing, restoring, closing, resizing, snapping, or repositioning the container.

At operation 1308, a request to perform a group function from the plurality of group functions associated with the container may be received via the user interface. Example input types to request the various types of group functions are illustrated and described with reference to FIGS. 3A, 3B, 4A, 5B, 6A, 7A, 8A.

At operation 1310, the group function associated with the container may be performed to cause the two windows to behave uniformly as a single window in accordance with the group function. For example, performance of one of the group functions of minimizing, maximizing, restoring, closing, resizing, snapping, or repositioning the container may cause each of the container and the two windows arranged therein to be correspondingly minimized, maximized, restored, closed, resized, snapped, or repositioned.

In other examples, a new window may be added to the container in response to receiving a request to group the new window, or an existing window may be released from the container in response to receiving a request to ungroup the existing window. Upon the addition or release, the windows within the container may be automatically re-arranged based on the rules. Additionally, a state of the container may be stored in a local data store of the system such that the container may be subsequently invoked and opened for display on the user interface in accordance with the stored state. In some examples, a new state of the container is saved each time the container is updated or changed (e.g., new windows, release of windows, new name, resizing, etc.). In other examples, the state of the container is stored in response to a closing of the container. In either example, after the container is closed, a request to invoke the container may be received, the state of the container may be retrieved from storage, and the container may be opened for display on the user interface in accordance with the retrieved state.

FIG. 14 is a block diagram illustrating physical components (e.g., hardware) of a computing device 1400 with which aspects of the disclosure may be practiced. For example, the computing device 1400 may illustrate components of processing devices or servers of the system 100, including the client computing device 102 and the servers 105 hosting the services 106. The computing device components described below may be suitable for the computing devices and systems described above. In a basic configuration, the computing device 1400 may include at least one processing unit 1402 and a system memory 1404 (such as processing unit 110 and memory 108 of the client computing device 102). Depending on the configuration and type of computing device, the system memory 1404 may comprise, but is not limited to, volatile storage (e.g., random access memory), non-volatile storage (e.g., read-only memory), flash memory, or any combination of such memories.

The system memory 1404 may include an operating system 1405 and one or more program modules 1406 suitable for running software application 1420, such as the operating system 120 and program modules 112 suitable for running software applications 114 on the client computing device 102, as well as the one or more virtual machines and/or one or more components associated with the hosted services 106 that are supported by the systems described herein. The operating system 1405, for example, may be suitable for controlling the operation of the computing device 1400.

Furthermore, embodiments of the disclosure may be practiced in conjunction with a graphics library, other operating systems, or any other application program and is not limited to any particular application or system. This basic configuration is illustrated in FIG. 14 by those components within a dashed line 1408. The computing device 1400 may have additional features or functionality. For example, the computing device 1400 may also include additional data storage devices (removable and/or non-removable) such as, for example, solid-state drives, magnetic disks, optical disks, or tape. Such additional storage is illustrated in FIG. 14 by a removable storage device 1409 and a non-removable storage device 1410.

As stated above, a number of program modules and data files may be stored in the system memory 1404. While executing on the processing unit 1402, the program modules 1406 (e.g., application 1420) may perform processes including, but not limited to, the aspects, as described herein. Other program modules that may be used in accordance with aspects of the present disclosure may include virtual machines, hypervisors, and other types of applications such as electronic mail and contacts applications, word processing applications, spreadsheet applications, note taking applications, database applications, slide presentation applications, drawing or computer-aided application programs, etc.

Furthermore, embodiments, or portions of embodiments, of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 14 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1400 may also have one or more input device(s) 1412 such as a keyboard, a mouse, a pen, a sound or voice input device, or a touch or swipe input device, among other similar input device types. The output device(s) 1414 such as a display, speakers, or a printer may also be included. The aforementioned devices are examples and others may be used. The computing device 1400 may include one or more communication connections 1416 allowing communications with other computing devices 1450. Examples of suitable communication connections 1416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1404, the removable storage device 1409, and the non-removable storage device 1410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1400. Any such computer storage media may be part of the computing device 1400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As previously discussed, the aspects and functionalities described herein may operate over distributed systems such as the system 100 described in FIG. 1, where application functionality, memory, data storage and retrieval and various processing functions may be operated remotely from each other over a distributed computing network, such as the Internet or an intranet. Resultantly, users may utilize associated client computing devices 102 to interact with the hosted services 106. User interfaces and information of various types may be displayed via on-board computing device displays or via remote display units associated with such computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

According to some aspects, systems are described herein. An example system includes at least one processor and at least one memory coupled to the at least one processor. The memory includes an operating system that is executing at least two different applications. The memory also stores instructions that, when executed by the at least one processor, cause the system to receive a request via a user interface of an operating system to group at least two windows displayed on the user interface that are associated with the at least two different applications, and generate a container. The container may include the two windows arranged based on one or more rules, and the arrangement may include an automatic sizing and positioning of the two windows within the container. The container may also include a plurality of features enabling a plurality of group functions associated with the container to be performed. The instructions, when executed by the at least one processor, further cause the system to receive a request to perform a group function from the plurality of group functions associated with the container via the user interface, and perform the group function associated with the container to cause the two windows to behave uniformly as a single window in accordance with the group function.

In some examples, the plurality of group functions associated with the container include minimizing, maximizing, restoring, closing, resizing, snapping, and/or repositioning the container, and to perform the group function associated with the container, the group function may be applied to each of the two windows. The rules for the automatic sizing and positioning of the two windows within the container may be based, at least in part, on a minimum window size associated with each respective application type. The rules may further include hierarchies relating to size, alignment, and/or proximity associated with the container and/or the two windows comprised therein.

In other examples, a request to ungroup the two windows may be received via the user interface, one of the two windows from the container may be released in response to the request to ungroup the two windows such that one window remains in the container, and the remaining one window in the container may be automatically resized and/or automatically repositioned. A state of the container may be stored in a local data store of the system to enable the container to be subsequently invoked and opened for display on the user interface in accordance with the stored state. The state of the container may identify a size of the container, a position of the container on the user interface, a name of the container, an application associated with each window included in the container, a content item associated with one or more windows included in the container, and/or a size or a position of each window included in the container.

In further examples, the operating system may be executing at least three applications, a third window associated with a third of the at least three applications may be open for display on the user interface separate from the container, and a request to group the third window with the two windows may be received via the user interface. The third window may be added into the container such that the container includes the two windows and the third window, where the two windows and the third window may be arranged within the container based on the rules. The arrangement based on the rules may cause an automatic sizing and positioning of the third window within the container, an automatic resizing of at least one of the two windows or the container, an automatic repositioning of at least one of the two windows, and/or an automatic ejecting of one of the two windows from the container in response to a determination that a minimum size of the third window exceeds an amount of remaining space available in the container.

In yet further examples, a name for the container may be automatically determined and displayed in a title bar of the container. The name for the container may be updated in response to receiving input associated with a modification to the name via the user interface, one or more new windows being grouped into the container, and/or one or more existing windows being released from the container. The container may be a window, a workspace of the window may comprise the two windows, and a title bar and/or a border of the window may comprise the plurality of features enabling the plurality of group functions associated with the container to be performed.

According to some aspects, computer-implemented methods are described herein. An example method may include receiving, via a user interface of an operating system, a request to group at least two windows displayed on the user interface that are associated with at least two different applications being executed by the operating system, and generating a container. The container may include the two windows arranged based on one or more rules, where the arrangement may include an automatic sizing and positioning of the two windows within the container. The container may also include a plurality of features enabling a plurality of group functions associated with the container to be performed. The method may also include receiving, via the user interface, a request to perform a group function from the plurality of group functions associated with the container, and performing the group function associated with the container to cause the two windows to behave uniformly as a single window in accordance with the group function.

In some examples, the received request to group the two windows may be an input type that includes a movement of one of the two windows in proximity to the other of the two windows. The received request to group the two windows may be an input type that includes a selection of a group option of a context menu displayed on the user interface in response to a particular input received via the user interface subsequent to a selection of the two windows.

In other examples, a request to ungroup the two windows, including an input type received via the user interface comprising a selection and movement of one of the two windows out of the container, may be received via the user interface, the one of the two windows selected and moved out of the container may be released such that the other window remains in the container, and the remaining other window may be automatically resized and/or automatically repositioned in the container based on the rules.

In further examples, a state of the container may be stored in a local data store, where the state of the container identifies a size of the container, a position of the container on the user interface, a name of the container, an application associated with each window included in the container, a content item associated with one or more windows included in the container, and/or a size and a position of each window included in the container. A request to invoke the container may be received, the stored state of the container may be retrieved from the local data store, and the container may be opened, for display on the user interface, in accordance with the stored state. The request to invoke the container may include: a first input type received via the user interface that includes a selection to open one or more of an application and a content item associated with an application that is identified in the stored state of the container; a second input type received via the user interface that includes an action indicating to present a display panel listing a plurality of containers having stored states; and/or a reboot of the operating system.

In yet further examples, performing the group function associated with the container may include performing a minimizing, maximizing, restoring, closing, resizing, snapping, and/or repositioning of the container, and the group function may be applied to each of the two windows. The rules for the automatic sizing and positioning of the two windows within the container may be based, at least in part, on a minimum window size associated with each respective application type.

In further aspects, computer storage media are described. An example computer storage media stores instructions that, when executed by a processor, cause the processor to perform operations. The operations may include receiving, via a user interface of the operating system, a request to group at least two windows displayed on the user interface that are associated with at least two different applications being executed by the operating system, and generating a container. The container may include the two windows arranged based on one or more rules, where the arrangement may include an automatic sizing and positioning of the two windows within the container. The container may also include a plurality of features enabling a plurality of group functions associated with the container to be performed. The operations may also include receiving, via the user interface, a request to perform a group function from the plurality of group functions associated with the container, and performing the group function associated with the container to cause the two windows to behave uniformly as a single window in accordance with the group function.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory coupled to the processor, the memory storing instructions that, when executed by the processor, perform operations comprising:
receiving, via a user interface, a request to group two windows displayed on the user interface that are associated with one or more applications;
accessing a container in which the two windows are arranged based on an automatic sizing and positioning of the two windows within the container, the container comprising one or more features enabling one or more group functions associated with the container to be performed, wherein a name portion of the container is automatically populated based on the one or more applications or content items associated with the two windows;
receiving, via the user interface, a request to perform a group function from the one or more group functions;
performing the group function to cause the two windows to behave uniformly as a single window in accordance with the group function.

2. The system of claim 1, wherein a first of the two windows is associated with a first application and a second of the two windows is associated with a second application that is different from the first application.

3. The system of claim 1, wherein a first of the two windows is associated with a first instance of an application and a second of the two windows is associated with a second instance of the application.

4. The system of claim 1, wherein the request to group the two windows comprises at least one of:
moving a first of the two windows proximate to a second of the two windows;
moving a first of the two windows inside of a second of the two windows; or
moving a first of the two windows to overlap a second of the two windows.

5. The system of claim 1, wherein the request to group the two windows comprises:
receiving a selection of a first of the two windows and a second of the two windows; and
receiving a selection of a window grouping option from a context menu provided by the first of the two windows or the second of the two windows.

6. The system of claim 1, wherein the request to group the two windows comprises receiving a voice command at the user interface, the voice command identifying a first of the two windows, a second of the two windows, and an intent to group the two windows.

7. The system of claim 1, wherein, in response to receiving the request to group the two windows, the container is generated and the two windows are arranged inside of the container.

8. The system of claim 1, wherein, in response to receiving the request to group the two windows, the two windows are added to the container, the container being generated prior to receiving the request to group the two windows.

9. The system of claim 1, wherein the container represents a hierarchy-based windowing system that includes a plurality of hierarchy levels, each hierarchy level of the plurality of hierarchy levels being associated with a set of functionalities related to controlling a respective hierarchy level.

10. The system of claim 9, wherein:
a first hierarchy level of the plurality of hierarchy levels comprises container-level functionalities for controlling both the two windows; and
a second hierarchy level of the plurality of hierarchy levels comprises window-level functionalities for separately controlling each of the two windows.

11. The system of claim 1, wherein the automatic sizing and positioning of the two windows within the container is based on a window size for an application type associated with at least one of the two windows.

12. The system of claim 1, wherein the automatic sizing and positioning of the two windows within the container is based on known user preferences for particular application types or content items.

13. The system of claim 1, wherein the automatic sizing and positioning of the two windows within the container is based on current usage of the two windows such that, when a first of the two windows has a higher usage rate than a second of the two windows, the first of the two windows is arranged with a larger size than the second of the two windows.

14. A method comprising:
receiving, via a user interface, a request to group two windows that are associated with one or more applications;
in response to the request to group the two windows, adding the two windows into a container based on one or more rules, wherein arrangement of the two windows in the container includes an automatic sizing and positioning of the two windows within the container, the container enabling one or more group functions associated with the container to be performed; and
updating a name portion of the container based on the one or more applications or content associated with the one or more applications.

15. The method of claim 14, further comprising:
receiving, via the user interface, a request to perform a group function from the one or more group functions; and
performing the group function to cause the two windows to behave uniformly as a single window in the container.

16. The method of claim 14, further comprising:
receiving a request to ungroup the two windows, the request comprising at least one of:
moving at least one of the two windows outside the container; or
moving at least one of the two windows beyond an exterior edge of the container.

17. The method of claim 16, further comprising:
in response to the request to ungroup the two windows, releasing a first of the two windows from the container, wherein releasing the first of the two windows comprises restoring the first of the two windows to at least one of a size or position the first of the two windows occupied in the user interface prior to the first of the two windows being added to the container.

18. A device comprising:
a processor; and
memory coupled to the processor, the memory storing instructions that, when executed by the processor, perform operations comprising:
receiving a request to group two windows that are associated with one or more applications;
grouping the two windows into a container based on one or more rules, the grouping including an automatic sizing and positioning of the two windows within the container, the container including one or more features enabling one or more group functions associated with the container to be performed, wherein a name portion of the container is updated based on the one or more applications or content items associated with the two windows;
receiving a request to ungroup the two windows;
in response to the request to ungroup the two windows, releasing a first of the two windows from the container such that a second of the two windows remains in the container; and
at least one of automatically resizing or repositioning the second of the two windows in the container.

19. The device of claim 18, wherein a first of the two windows is associated with a first application and a second of the two windows is associated with a second application that is different from the first application.

20. The device of claim 18, the operations further comprising:
in response to the request to ungroup the two windows, releasing a first of the two windows from the container such that a second of the two windows remains in the container.

* * * * *